(12) United States Patent
Wang et al.

(10) Patent No.: US 12,339,410 B2
(45) Date of Patent: Jun. 24, 2025

(54) DETERMINING SHEAR SLOWNESS FROM DIPOLE SOURCE-BASED MEASUREMENTS ACQUIRED BY A LOGGING WHILE DRILLING ACOUSTIC MEASUREMENT TOOL

(71) Applicant: Schlumberger Technology Corporation, Sugar Land, TX (US)

(72) Inventors: Pu Wang, Arlington, MA (US); Sandip Bose, Brookline, MA (US); Bikash K. Sinha, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/445,956

(22) Filed: Aug. 26, 2021

(65) Prior Publication Data

US 2021/0389487 A1    Dec. 16, 2021

Related U.S. Application Data

(62) Division of application No. 15/331,946, filed on Oct. 24, 2016, now abandoned.
(Continued)

(51) Int. Cl.
*G01V 1/28* (2006.01)
*G01V 1/30* (2006.01)
(Continued)

(52) U.S. Cl.
CPC .............. *G01V 1/284* (2013.01); *G01V 1/282* (2013.01); *G01V 1/303* (2013.01); *G01V 1/325* (2013.01);
(Continued)

(58) Field of Classification Search
None
See application file for complete search history.

(56) References Cited

U.S. PATENT DOCUMENTS 4,888,740 A    12/1989    Brie et al.
5,077,697 A    12/1991    Chang
(Continued)

FOREIGN PATENT DOCUMENTS

CN    103245956 A  *  8/2013
WO    WO-9307512 A1 *  4/1993    ............... G01V 1/48

OTHER PUBLICATIONS

Machine Translation for CN103245956A (Year: 2013).*
(Continued)

*Primary Examiner* — Arleen M Vazquez
*Assistant Examiner* — Leonard S Liang
(74) *Attorney, Agent, or Firm* — Jeffrey D. Frantz

(57) ABSTRACT

A method for determining a shear slowness of a subterranean formation includes receiving waveforms data acquired by receivers in an acoustic measurement tool in response to energy emitted by at least one dipole source. The waveforms are processed to extract a formation flexural acoustic mode and a tool flexural acoustic mode. The processing includes transforming the time domain waveforms to frequency domain waveforms, processing the frequency domain waveforms with a Capon algorithm to compute a two-dimensional spectrum over a chosen range of group slowness and phase slowness values; and processing the two-dimensional spectrum to extract the multi-mode slowness dispersion. The method further includes selecting a plurality of slowness-frequency pairs from the formation flexural mode of the extracted multi-mode dispersion wherein each slowness-frequency pair comprises a slowness value at a corresponding frequency and processing the selected slowness fre-
(Continued)

quency pairs to compute the shear slowness of the subterranean formation.

17 Claims, 28 Drawing Sheets

Related U.S. Application Data

(60) Provisional application No. 62/247,171, filed on Oct. 27, 2015.

(51) Int. Cl.
| | | |
|---|---|---|
| *G01V 1/32* | (2006.01) | |
| *G01V 1/50* | (2006.01) | |
| G01V 1/44 | (2006.01) | |
| G01V 1/46 | (2006.01) | |
| G01V 1/48 | (2006.01) | |

(52) U.S. Cl.
CPC ............. *G01V 1/50* (2013.01); *G01V 1/306* (2013.01); *G01V 1/44* (2013.01); *G01V 1/46* (2013.01); *G01V 1/48* (2013.01); *G01V 2200/16* (2013.01); *G01V 2210/47* (2013.01); *G01V 2210/614* (2013.01); *G01V 2210/6222* (2013.01)

(56) References Cited

U.S. PATENT DOCUMENTS

| | | | |
|---|---|---|---|
| 5,587,966 | A | 12/1996 | Kimball et al. |
| 5,661,696 | A | 8/1997 | Kimball et al. |
| 5,808,963 | A | 9/1998 | Esmersoy |
| 6,449,560 | B1 | 9/2002 | Kimball |
| 6,614,716 | B2 | 9/2003 | Plona et al. |
| 6,718,266 | B1 | 4/2004 | Sinha et al. |
| 6,957,572 | B1 | 10/2005 | Wu |
| 7,643,374 | B2 | 1/2010 | Plona et al. |
| 7,649,805 | B2 | 1/2010 | Bose et al. |
| 7,652,950 | B2 | 1/2010 | Sinha et al. |
| 7,830,744 | B2 | 11/2010 | Wu et al. |
| 8,102,732 | B2 | 1/2012 | Pabon et al. |
| 8,339,897 | B2 | 12/2012 | Aeron et al. |
| 9,086,508 | B2 | 7/2015 | Sinha et al. |
| 9,334,718 | B2 | 5/2016 | Valero et al. |
| 2005/0254343 | A1 | 11/2005 | Saiki et al. |
| 2006/0256655 | A1 | 11/2006 | Sinha et al. |
| 2006/0285437 | A1 | 12/2006 | Sinha et al. |
| 2008/0065333 | A1 | 3/2008 | Beasley |
| 2009/0010104 | A1 | 1/2009 | Leaney |
| 2009/0070042 | A1 | 3/2009 | Birchwood |
| 2010/0085835 | A1 | 4/2010 | Tang et al. |
| 2010/0106440 | A1 | 4/2010 | Richmond |
| 2010/0157731 | A1 | 6/2010 | Aeron et al. |
| 2010/0286919 | A1* | 11/2010 | Lee .................. G01V 1/28 702/18 |
| 2011/0026730 | A1 | 2/2011 | Li et al. |
| 2011/0058451 | A1 | 3/2011 | Yoneshima |
| 2012/0287754 | A1 | 11/2012 | Johnson |
| 2013/0044568 | A1 | 2/2013 | Curry |
| 2014/0086009 | A1 | 3/2014 | Yoneshima |
| 2014/0365133 | A1 | 12/2014 | Elkington et al. |
| 2015/0029823 | A1 | 1/2015 | Yang et al. |
| 2015/0117151 | A1 | 4/2015 | Curry et al. |
| 2016/0209538 | A1 | 7/2016 | Wang et al. |
| 2016/0291185 | A1 | 10/2016 | Wang et al. |
| 2017/0115413 | A1 | 4/2017 | Wang et al. |
| 2017/0115414 | A1 | 4/2017 | Wang et al. |
| 2017/0184751 | A1* | 6/2017 | Ang .................. G01V 1/44 |
| 2018/0010443 | A1 | 1/2018 | Lu et al. |
| 2018/0196156 | A1 | 7/2018 | Assous et al. |
| 2019/0025451 | A1 | 1/2019 | Wang et al. |
| 2019/0025452 | A1 | 1/2019 | Wang et al. |
| 2019/0086571 | A1 | 3/2019 | Walker |
| 2019/0129053 | A1 | 5/2019 | Wang et al. |
| 2019/0154856 | A1 | 5/2019 | Valero et al. |
| 2020/0191943 | A1* | 6/2020 | Wu .................. G01S 13/726 |
| 2020/0363551 | A1 | 11/2020 | Assous |

OTHER PUBLICATIONS

Long, Xian; Salehin, S.M. Akramus; and Abhayapala, T.D.—"Robust Capon Beamformer With Frequency Smoothing Applied to Medical Ultrasound Imaging"; 2014 IEEE Workshop on Statistical Signal Processing (SSP). (Year: 2014).*

Gal, M.; Reading, A.M.; Ellingsen, S.P.; Koper, K.D.; Gibbons, S.J.; and Nasholm, S.P.—"Improved implementation of the fk and Capon methods for array analysis of seismic noise"; Geophys. J. Int.(2014) 198, 1045-1054. (Year: 2014).*

Sinha et al., "Influence of a pipe tool on borehole modes", Geophysics, vol. 74(3), May-Jun. 2009, pp. E111-E123.

Aeron et al., "Automatic dispersion extraction using continuous wavelet transform", in proceedings of the International Conference on Acoustics, Speech, and Signal Processing, Las Vegas, NV, 2008, pp. 2405-2408.

Lang et al., "Estimating slowness dispersion from arrays of sonic logging waveforms," Geophysics, vol. 52, No. 4, Apr. 1987, pp. 530-544.

M. P. Ekstrom, "Dispersion estimation from borehole acoustic arrays using a modified matrix pencil algorithm," in Proc. 29th Asilomar Conf. Signals, Syst., Comput., vol. 2, Pacific Grove, CA, Nov. 1995, pp. 449-453.

Hisu et al., "Parametric estimation of phase and group slowness from sonic logging waveforms," Geophysics, vol. 57, No. 8, Aug. 1992, pp. 978-985.

Aeron et al., "Broadband dispersion extraction using simultaneous sparse penalization," IEEE Trans, on Signal Process., vol. 59, No. 10, Oct. 2011, pp. 4821-4837.

Wang et al., "Broadband dispersion extraction of borehole acoustic modes via sparse Bayesian learning," in proceedings of the IEEE 5th International Workshop on Computational Advances in Multi-Sensor Adaptive Processing, Saint Martine, 2013, pp. 268-271.

Plona et al., "Slowness-frequency projection logs: a new QC method for accurate sonic slowness evaluation," in proceedings of the SPWLA 46th Annual Logging Symposium, Jun. 2005, 7 pages.

Wang et al., "Cramer—Rao bounds for broadband dispersion extraction of borehole acoustic modes," IEEE Signal Processing Letters vol. 21, No. 9, May 2014, pp. 1083-1087.

Braunisch et al., "Inversion of borehole dispersions for formation elastic moduli" in proceedings of 2000 IEEE International Ultrasonics Symposium, Puerto Rico, Oct. 2000, pp. 551-556.

Braunisch et al., "Inversion of guided-wave dispersion data with application to borehole acoustics," J Acoust. Soc. Am., vol. 115 (1), Jan. 2004, pp. 269-279.

Yang et al., "Estimation of formation shear and borehole fluid slownesses using sonic dispersion data in the presence of a drill collar" the 2011 Annual SEG Meeting, San Antonio, TX, 2011, pp. 464-468.

Yang et al., "Estimation of formation shear and borehole-fluid slownesses using sonic dispersion data in well-bonded cased boreholes", Geophysics, vol. 76(6), Nov.-Dec. 2011, pp. E187-E197.

Tang et al., "A curve-fitting method for analyzing dispersion characteristics of guided elastic waves", SEG International Exposition and Annual Meeting, Houston, Texas, 2009, pp. 461-465.

Long, X., "Frequency Smoothed Robust Capon Beamformer Applied to Medical Ultrasound Imaging", A Thesis Submitted for the Degree of Master of Philosophy at the Australian National University, Jul. 2014, 92 pages.

Office Action issued in U.S. Appl. No. 15/331,958 on Jul. 3, 2018, 12 pages.

Office Action issued in U.S. Appl. No. 15/331,958 on Feb. 21, 2019, 10 pages.

* cited by examiner

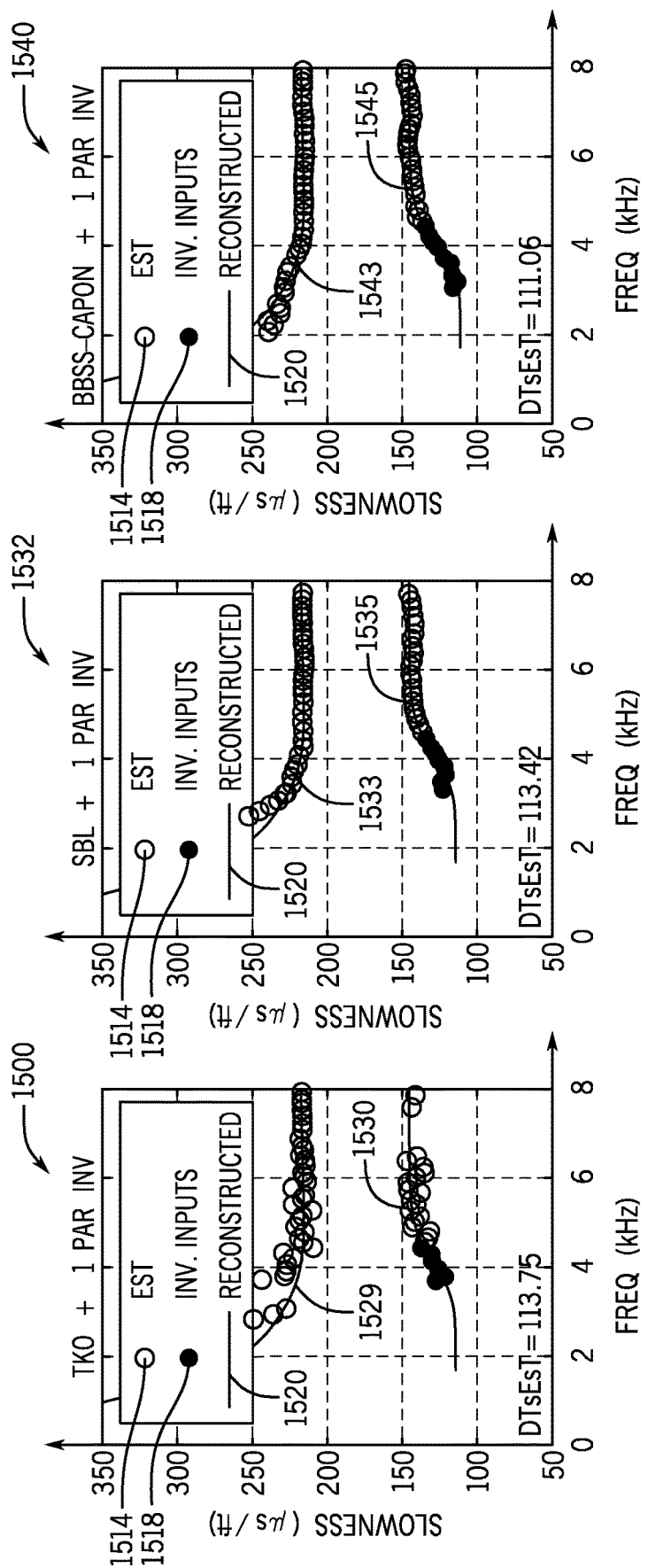

DETERMINING SHEAR SLOWNESS FROM DIPOLE SOURCE-BASED MEASUREMENTS ACQUIRED BY A LOGGING WHILE DRILLING ACOUSTIC MEASUREMENT TOOL

RELATED APPLICATIONS

This application is a divisional application of U.S. patent application Ser. No. 15/331,946, which was filed on Oct. 24, 2016 and which claims the benefit pursuant to 35 U. S.C. § 119(e) to U.S. Provisional Patent Application Ser. No. 62/247171, to Pu Wang, et. al., entitled, "AN INTEGRATED WORKFLOW FOR DIPOLE SHEAR SLOWNESS ESTIMATION IN LOGGING WHILE DRILLING ACOUSTIC TOOLS," which was filed on Oct. 27, 2015, both of which are incorporated by reference in their entirety.

BACKGROUND

Hydrocarbon fluids, such as oil and natural gas, are obtained from a subterranean geologic formation, referred to as a reservoir, by drilling a well that penetrates the hydrocarbon-bearing formation. During drilling and at other stages of exploration through production, various downhole tools may be used to acquire data for purpose of evaluating, analyzing, and monitoring the well bore and the surrounding geological strata. In some cases, the acquired data includes sonic or seismic data, i.e., data acquired by sensors, or receivers, in response to sonic/seismic energy interacting with the wellbore and the surrounding geological strata. The acquired data may be processed and interpreted for purposes of deriving information regarding the hydrocarbon-bearing formation, the well and other aspects pertaining to subterranean exploration.

SUMMARY

In some embodiments, a method for determining a shear slowness of a subterranean formation includes receiving waveforms data acquired by receivers in an acoustic measurement tool in response to energy emitted by at least one dipole source. The waveforms are processed to extract a formation flexural acoustic mode and a tool flexural acoustic mode. The processing includes transforming the time domain waveforms to frequency domain waveforms, processing the frequency domain waveforms with a Capon algorithm to compute a two-dimensional spectrum over a chosen range of group slowness and phase slowness values; and processing the two-dimensional spectrum to extract the multi-mode slowness dispersion. The method further includes selecting a plurality of slowness-frequency pairs from the formation flexural mode of the extracted multi-mode dispersion wherein each slowness-frequency pair comprises a slowness value at a corresponding frequency and processing the selected slowness frequency pairs to compute the shear slowness of the subterranean formation.

In some embodiments, an apparatus or logging system includes an interface configured to receive time domain waveforms acquired by a logging while drilling (LWD) tool in a well in response to energy being emitted by at least one dipole acoustic source and a processor. The processor is configured to: transform the time domain waveforms to frequency domain waveforms, process the frequency domain waveforms with a Capon algorithm to compute a two-dimensional spectrum over a chosen range of group slowness and phase slowness values, process the two-dimensional spectrum to extract a multi-mode slowness dispersion, select a plurality of slowness frequency pairs from the multi-mode dispersion, and process the selected slowness frequency pairs to compute a shear slowness of a subterranean formation.

Advantages and other features will become apparent from the following description, drawings and claims.

BRIEF DESCRIPTION OF THE DRAWINGS

FIG. 15A is an illustration of, for a fast formation, the use of TKO-based dispersion extraction and single parameter model inversion using slowness-frequency inputs selected from an extracted formation flexural dispersion to estimate shear slowness according to an example implementation.

FIG. 15B is an illustration of, for a fast formation, the use of Sparse Bayesian Learning (SBL)-based dispersion extraction and single parameter model inversion using slowness-frequency inputs selected from the extracted formation flexural dispersion to estimate shear slowness according to an example implementation.

FIG. 15C is an illustration of the use of, for a fast formation, BBSS-Capon-based dispersion extraction and single parameter model inversion using slowness-frequency inputs selected from an extracted formation flexural dispersion to estimate shear slowness according to an example implementation.

DETAILED DESCRIPTION

Figure 1:
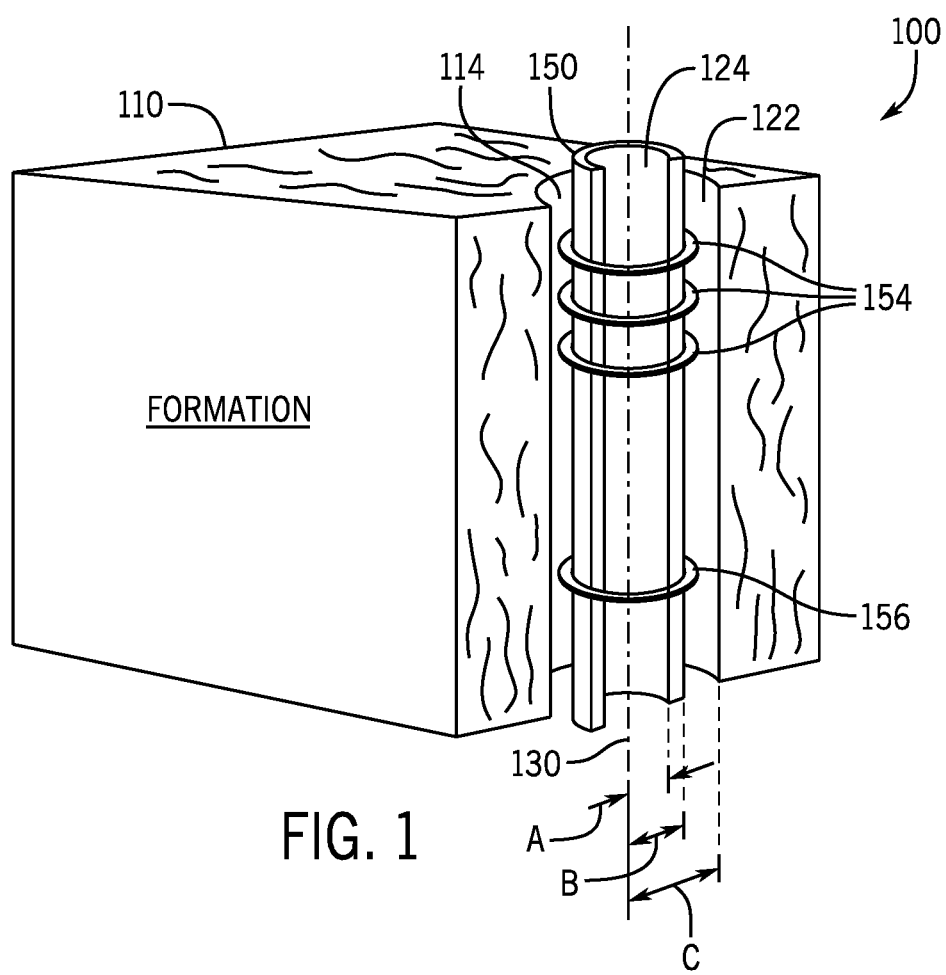
FIG. 1 is an illustration of an acoustic measurement tool in a borehole according to an example implementation.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a well or wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. Chemicals and chemical properties of interest in oilfield exploration and development may also be measured and stored by the sensing systems contemplated by the present disclosure. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Borehole acoustic logging is a major part of subsurface formation evaluation that is key to oil and gas exploration and production. The logging may be achieved using an acoustic measurement tool, which includes one or multiple acoustic transducers, or sources, and one or multiple sensors, or receivers. The acoustic measurement tool may be deployed in a fluid-field wellbore for purposes of exciting and recording acoustic waveforms. The receivers thus, may acquire data representing acoustic energy that results from the acoustic energy that is emitted by the acoustic sources of the acoustic measurement tool.

The acoustic propagation in the borehole is affected by the properties of rocks surrounding the wellbore. More specifically, the fluid-filled borehole supports propagation of certain number of borehole guided modes that are generated by energy from a source that is placed inside the borehole fluid. These borehole acoustic modes are characterized by their acoustic slowness (i.e., reciprocal of velocity) dispersions, which contain valuable information about the rock mechanical properties. Therefore, the acoustic logging may provide answers pertaining to such diverse applications as geophysical calibration of seismic imaging, geomechanical assessment of wellbore stability, and stress characterization for fracture stimulation. In the context of this application, "acoustic energy" refers to energy in the sonic frequency spectrum, and may be, as example, energy between 200 Hertz (Hz) and 30 kiloHertz (kHz).

In general, the energy that is emitted by the sources of the acoustic measurement tool may travel through rock formations as either body waves or surface waves (called "flexural waves" herein). The body waves include compressional waves, or P-waves, which are waves in which small particle vibrations occur in the same direction as the direction in which the wave is traveling. The body waves may also include shear waves, or S-waves, which are waves in which particle motion occurs in a direction that is perpendicular to the direction of wave propagation. In addition to the body waves, there are a variety of borehole guided modes whose propagation characteristics can be analyzed to estimate certain rock properties of the surrounding formation. For instance, axi-symmetric Stoneley and borehole flexural waves are of particular interest in determining the formation shear slownesses. As described herein, the flexural waves may also include waves that propagate along the acoustic measurement tool.

The acoustic measurement tool may include multiple acoustic sources that are associated with multiple source classifications, or categories. For example, the acoustic measurement tool may include one or multiple monopole sources. In response to energy from a monopole sonic source, the receivers of the acoustic measurement tool may acquire data representing energy attributable to various wave modes, such as data representing P-waves, S-waves and Stoneley waves.

The acoustic measurement tool may also include one or multiple directional sources, such as dipole or quadrupole sources, which produce additional borehole guided waves, which travel through the fluid in the borehole and along the sonic tool itself. Data representing these flexural waves may be processed for such purposes as determining the presence or absence of azimuthal anisotropy. For example implementations that are described herein, the data representing the flexural waves is processed for purposes of determining a formation shear slowness.

The speeds at which the aforementioned waves travel are affected by various properties of the downhole environment, such as the rock mechanical properties, density and elastic dynamic constants, the amount and type of fluid present in the formation, the makeup of rock grains, the degree of inter-grain cementation and so forth. Therefore, by measuring the speed of acoustic wave propagation in the borehole, it is possible to characterize the surrounding formations based on sensed parameters relating to these properties. The speed, or velocity of a given sonic wave, or waveform, may be expressed in terms of the inverse of its velocity, which is referred to herein as the "slowness." In this context, an "acoustic wave" or "acoustic waveform" may refer to a particular time segment of energy recorded by one or multiple receivers and may correspond to a particular acoustic waveform mode, such as a body wave, flexural or other guided borehole waves.

Certain acoustic waves are non-dispersive, or do not significantly vary with respect to frequency. Other acoustic waves, however, are dispersive, meaning that the wave-slownesses vary as a function of frequency.

The acoustic measurement tool may be deployed on a number of platforms, such as a logging while drilling (LWD) platform. In other words, an LWD acoustic measurement tool is disposed on a drilling string, or pipe. Recently introduced LWD acoustic measurement tools may provide data from which both compressional and shear slownesses may be determined for purposes of aiding engineers to drill with greater confidence, determine optimal directions for drilling and identify rocks with better completion characteristics. Particularly, data acquired by an LWD acoustic measurement tool has been particularly used to determine monopole source-derived compressional and shear slownesses for fast formations and quadrupole source-derived shear slowness mostly for slow formations.

In this context, a "fast formation" refers to a formation in which the shear wave velocity is greater than the compressional velocity of the borehole fluid (or "drilling mud"). Otherwise, the formation is a "slow" formation.

In general, the shear slownesses for both the fast and slow formations have not been determined from acoustic measurements of energy emitted using a dipole source in the presence of a LWD sonic tool structure. Although shear slowness may theoretically be determined from the formation dipole flexural signal, one of the challenges associated with such an approach is that the formation dipole flexural signal is to be extracted from the relatively strongly interfering collar dipole flexural signal. In this manner, for drilling safe drilling operation, an LWD acoustic measurement tool may include a steel drill collar, and the collar may have a strength as strong as the drill string. As a result, the acoustic waves from the dipole source propagate directly through the drill collar, and their amplitudes at the receivers are stronger than the formation signal that probes the formation's elastic properties.

Another challenge with determining the shear slowness from dipole formation flexural signal data is that the acquired data quality may be overwhelmed by the drilling noise and vibration. Evidently, the downhole drilling environment creates more inhospitable conditions for the LWD-based acoustic measurement tool than the counterpart wireline-based tool. For example, the drill bit grinds through layers of rock as the rotating drill string and bottom-hole assembly (BHA) continually slam against the borehole wall, thereby vibrating sensitive electronic components of the acoustic measurement tool. Moreover, drilling mud surges through the central passageway of the drill string, exits through the drill bit at the end of the drill string, and brings cuttings to the Earth surface, all elevating the noise level.

Yet another challenge with determining shear slowness from dipole formation flexural signal data arises from the presence of a steel drill collar, which calls for a customized model-based inversion that explicitly takes into account its presence for accurate estimation of the shear slowness. Finally, due to the fast rotation of the drill collar, challenges may arise in centering the LWD acoustic measurement tool in the borehole center, especially during deviated/horizontal drilling because of gravitational pull.

Referring to FIG. 1, for a given downhole environment 100, an acoustic measurement tool 150 may be modeled as a simple pipe tool in a fluid-filled borehole 114, which may be surrounded by a fast or slow formation 110. In accordance with example implementations, the acoustic measurement tool 150 may be an LWD-based tool, which is deployed downhole on a drill string. The acoustic measurement tool 150 is surrounded by liquid in a central passageway 124 of the acoustic measurement tool 150, as well as surrounded by liquid in an annulus 122, which is the annular region between the outside of the acoustic measurement tool 150 and the wellbore wall. In FIG. 1, "A" represents the inner radius of acoustic measurement tool 150, as referenced from a central axis 130 of the tool 150. Moreover, "B" refers to the outer radius of the acoustic measurement tool 150, and the "C" refers to the borehole radius.

In accordance with example implementations, the acoustic measurement tool 150 includes an acoustic dipole source 156, along with potentially other sources, such as a monopole source, a quadrupole source, one or multiple additional dipole sources, and so forth. Moreover, in accordance with example implementations, the acoustic measurement tool 150 may include one or multiple acoustic sensors, or receivers 154, which acquire data that represents time domain waveforms and which is processed as described herein. The receivers 154 may be arranged in an array of receivers, and in accordance with example implementations, the acoustic measurement tool 150 may include multiple receiver arrays.

In accordance with example implementations, data acquired by the receivers 154 in response to one or multiple dipole source firings (by dipole source(s) of the tool 150) is processed to determine a shear slowness (herein called a "dipole source-derived shear slowness" or, in an abbreviated form, a "dipole shear slowness"). More specifically, in accordance with example implementations, a dipole shear slowness is determined by extracting multiple slowness versus frequency characteristics or curves (called "dispersions" herein) for multiple corresponding acoustic modes; identifying a selected subset of slowness-frequency inputs from one or multiple of these extracted dispersions; and deriving the dipole shear slowness from these identified slowness-frequency inputs. More specifically, determining the shear slowness may involve performing either a single parameter model inversion for the shear slowness based on the identified slowness-frequency input pairs; performing a two parameter model inversion for shear slowness and mud slowness based on the identified slowness-frequency input pairs; or, for fast formations having a relatively high signal-to-noise ratio (SNR), determining the shear slowness from an asymptote of the extracted formation flexural dispersion.

Figure 2:
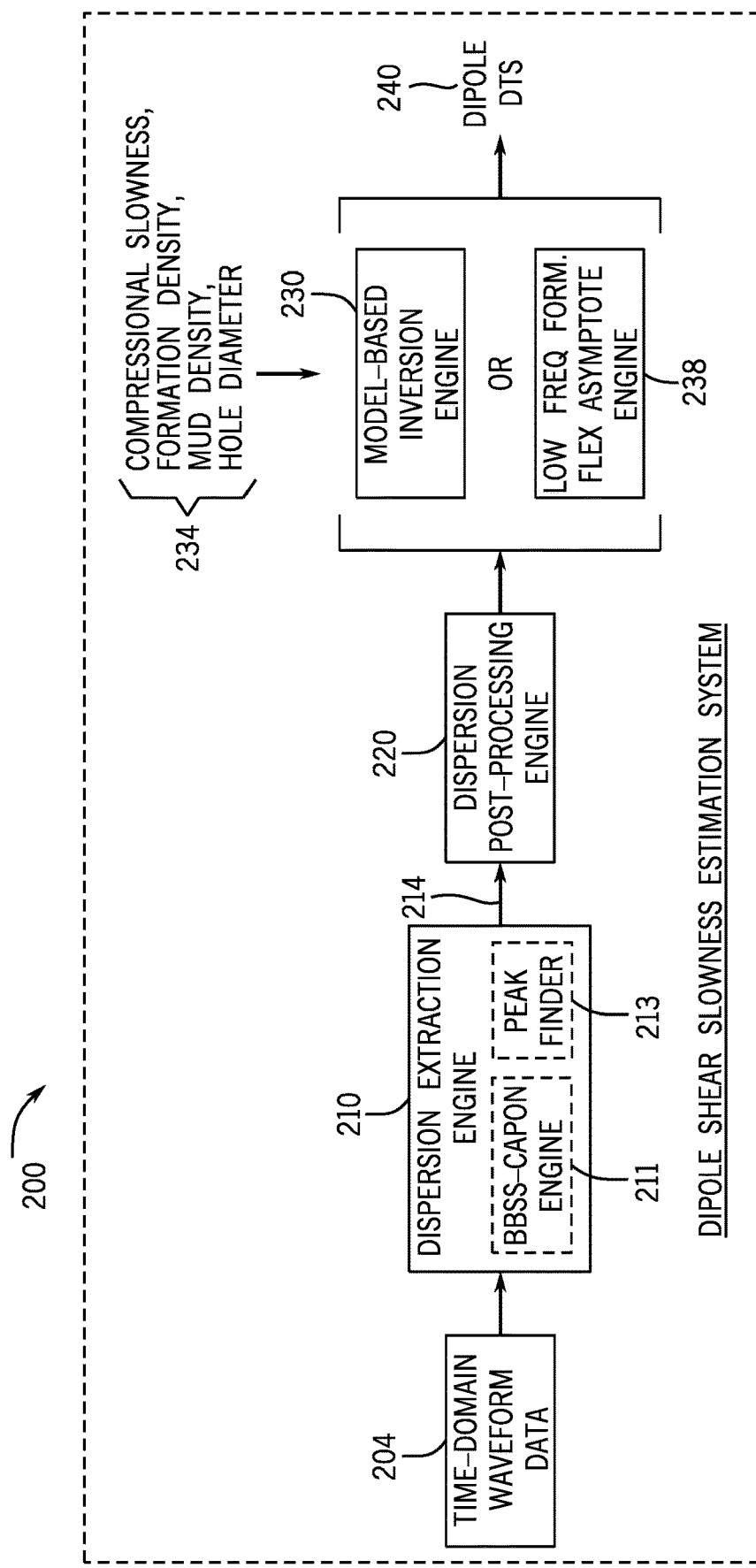
FIG. 2 is a schematic diagram of a system to estimate shear slowness from dipole source-based measurements acquired by a logging while drilling (LWD) acoustic measurement tool according to an example implementation.

Referring to FIG. 2, more specifically, in accordance with example implementations, a system 200 may be used for purposes of determining a dipole shear slowness 240. In accordance with example implementations that are discussed herein, the system 200 processes data acquired by an LWD acoustic measurement tool in response to energy that is emitted by one or multiple dipole sources; and the data represents multiple acoustic modes. These acoustic modes include flexural modes, which are dispersive in nature (i.e., the slowness varies as a function of frequency).

More specifically, the system 200 includes a dispersion extraction engine 210 that processes time domain waveform data 204 to extract dispersions for multiple acoustic modes. The time domain waveform data 204 is data that may be acquired by the receivers 154 (FIG. 1) of the acoustic measurement tool 150 in response to energy that is emitted due to the firing of one or multiple dipole sources of the tool 150. For a dipole source firing and a fast formation, the extracted tool and formation flexural dispersions are separate. In this manner, for a given frequency, the slowness values for the respective formation flexural and tool flexural acoustic modes differ. Moreover, for a dipole source firing and a slow formation, the slowness values for the tool and formation flexural acoustic modes may be mixed together so that these modes may be represented in combination by a single extracted dispersion.

Because the different flexural acoustic modes may carry different amounts of information about the formation, the mud and the tool, post-processing of the raw dispersion curves, the system 200 includes a dispersion post processing engine 220, which processes an output 214 of the dispersion extraction engine 210 to track and label the acoustic modes that result from the dispersion extraction.

More specifically, as described herein, the dispersion extraction engine 210 may perform relatively robust multiple mode dispersion extraction methods, especially for weak formation flexural acoustic modes in fast formations. More specifically, depending on the particular implementation, the dispersion extraction engine 210 may use any of the following dispersion extraction techniques as well as other techniques: a modified matrix pencil dispersion extraction technique (herein called the "TKO-based technique"); a broadband Capon-based dispersion extraction technique; a broadband LASSO-based dispersion extraction technique; or a broadband Sparse Bayesian Learning (SBL)-based dispersion extraction. The TKO-based technique may be similar to the dispersion extraction technique that is described in Ekstrom, M. P., 1995, Dispersion Estimation from Borehole Acoustic Arrays Using a Modified Matrix Pencil Algorithm, 29th Asilomar Conference on Signals, Systems, and Computers.

The particular dispersion extraction technique that is used may depend on such factors as time, budget, computational resources, targeted performance, and so forth. Moreover, as described herein, in accordance with some implementations, the dispersion extraction engine 210 may perform a broadband dispersion extraction technique, which employs an additional step of spatial smoothing (i.e., smoothing along the receiver offset direction) to the broadband Capon-based technique to mitigate the constraint of a homogenous array signal at neighboring frequency points and reduce the computational complexity (complexity caused by inversion of a matrix, for example).

In accordance with example implementations, the system 200 includes a dispersion post-processing engine 220 for purposes of performing a second step in the determination of the dipole shear slowness 240. In this manner, in the second step, the dispersion post-processing engine 220 labels the raw slownesses as belonging to particular acoustic modes. In this manner, for a fast formation, the dispersion post-processing engine 220 may label the raw slownesses as belonging to formation and tool flexural acoustic modes; and for a slow formation, the dispersion post-processing engine 220 may label slownesses as belonging to a mixture of tool and formation flexural acoustic modes. After this labeling, the dispersion post-processing engine 220 may then identify inputs, i.e., slowness-frequency pairs from the labeled flexural acoustic modes, which are used as inputs for a third step that is employed by the system 200. This identification may be completely automated or may be performed in conjunction with manual (i.e., human) identification-guiding input, depending on the particular implementation, as described further herein. Regardless of how the dispersion post-processing engine 220 selects the slowness-frequency input pairs, the pairs are selected by taking into account the dispersion sensitivity to the shear slowness and the uncertainty of the dispersion estimation, as further described herein.

Lastly, in accordance with example implementations, the system 200 performs a third step to estimate the dipole shear slowness 240 from the identified slowness-frequency input pairs. For the scenario in which the acoustic measurements are acquired in a fast formation and are associated with a relatively high SNR (an SNR at, near or above 20 dB, for example), the system 200 may determine the shear slowness 240 using a low frequency formation flexural asymptote engine 238, which bases the shear slowness determination on a low-frequency asymptote of the extracted formation flexural dispersions.

For the other cases (slow formations or fast formation coupled with a lower SNR), in accordance with example implementations, the system 200 includes a model-based inversion engine 230. The model-based inversion engine 230 employs a model that explicitly accounts for the presence of the acoustic measurement tool in the borehole. As such, the model-based inversion engine 230 may consider such model inputs 234 as compressional slowness, formation density, mud density, hole diameter, and so forth. Therefore, for the slow formation, when the tool flexural acoustic mode significantly interferes with the formation flexural acoustic mode at the low frequency region, the model-based inversion is used, as the low-frequency asymptote of the extracted formation flexural dispersion no longer converges to the shear slowness. In accordance with example implementations, for the model-based inversion, a boundary condition determinant associated with a concentrically placed cylindrical structure is used to construct the cost function and estimate multiple physical parameters of interest from numerical optimization techniques.

The following describes the multiple mode dispersion extraction that is performed by the engine 210, in accordance with example implementations.

In general, depending on the particular implementation, the dispersion extraction engine 210 may employ one of several different multiple mode acoustic dispersion extraction techniques either in the space-frequency domain or the space-time frequency domain, depending on the particular implementation. For example, the dispersion extraction engine 210 may employ, for the space-time-frequency approach, a continuous wavelet transform to extract the borehole acoustic dispersion. Utilizing the time-frequency separation of multiple modes, the modulus approach and the exponentially projected Radon transform (EPRT) approach can be applied to borehole acoustic waveforms. The dispersion extraction engine 210 may also apply a space-frequency domain-based dispersion extraction technique, either using a narrowband (single-frequency) technique or a broadband (multiple frequency technique), depending on the particular implementation.

Figure 3A:
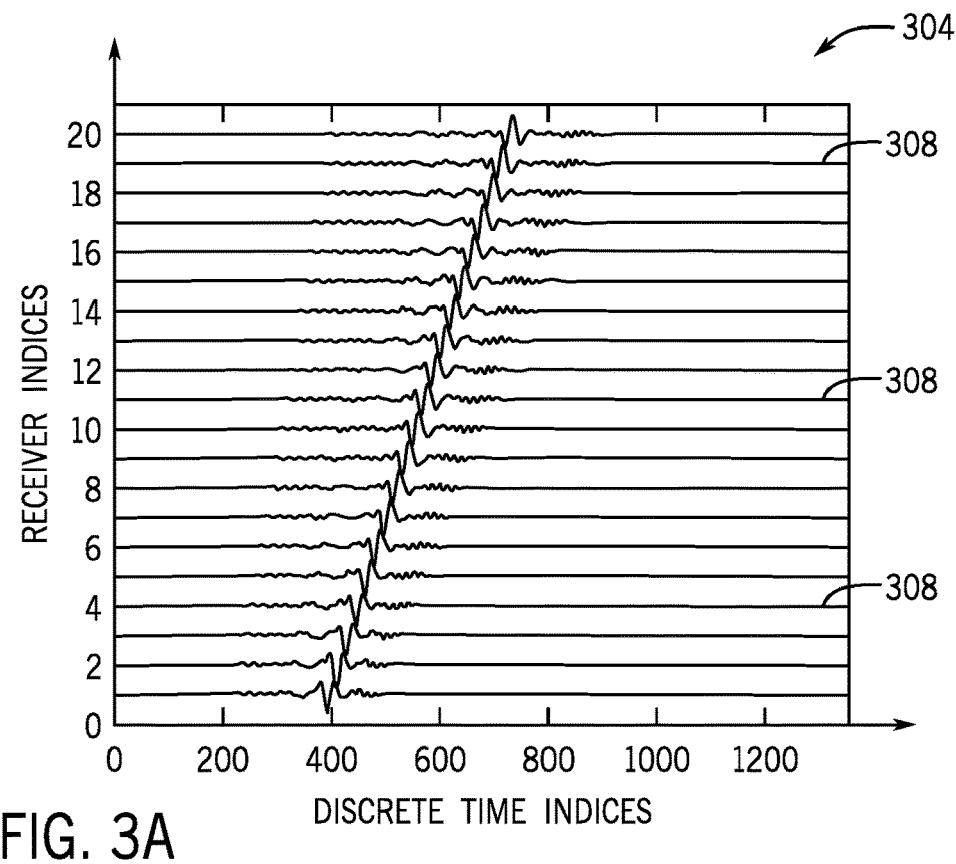
FIG. 3A is an illustration of time domain dipole waveforms acquired by receivers of the LWD acoustic measurement tool in response to energy emitted by a dipole source of the tool according to an example implementation.
Figure 3B:
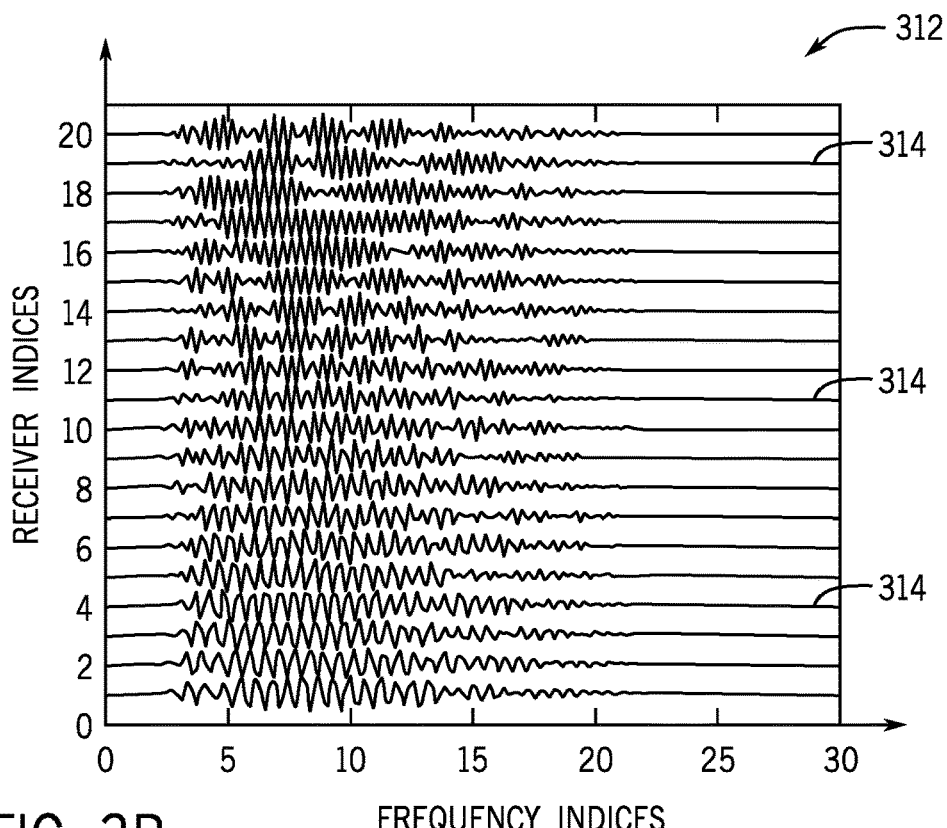
FIG. 3B is an illustration of the waveforms of FIG. 3A transformed into the frequency domain according to an example implementation.

FIGS. 3A, 3B, 3C and 3D illustrate frequency-based dispersion extraction techniques. More specifically, FIG. 3A is an illustration 304 of time domain acoustic waveforms 308 acquired by the sensors, or receivers, of the acoustic measurement tool in accordance with example implementations. The first step involves converting the time domain acoustic waveforms 308 into frequency domain acoustic waveforms 314, which are shown in an illustration 312 of FIG. 3B. Next, the frequency domain waveforms 314 are processed using either a narrowband technique (depicted by an illustration 320 of FIG. 3C) or a broadband technique (shown in an illustration 330 of FIG. 3D).

Figure 3C:
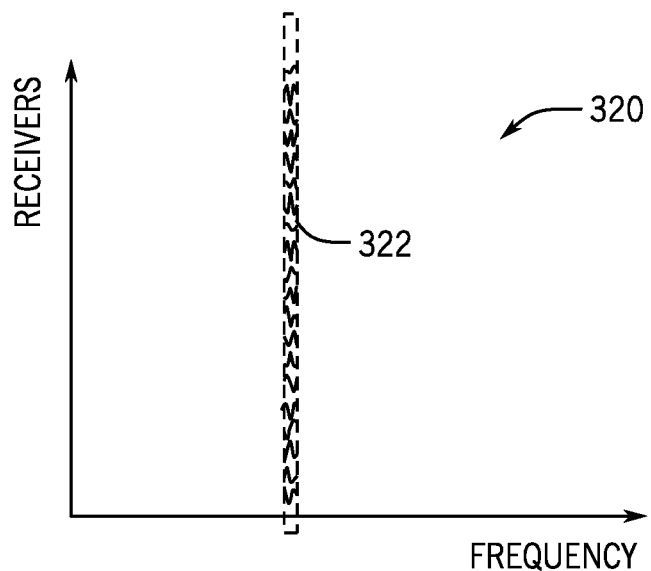
FIG. 3C illustrates a single frequency space-frequency band associated with a narrowband dispersion extraction technique according to an example implementation.

More specifically, referring to FIG. 3C, for the narrowband framework, the slowness values for the extracted dispersions are estimated independently from one frequency to another, as illustrated by the single frequency narrowband 322. Thus, as illustrated in FIG. 3C, the narrowband technique only processes the frequency-domain waveforms at a particular frequency point at a time, and then advances the processing to the next adjacent frequency point. Prony's dispersion extraction technique and the TKO dispersion extraction technique belong to this category. By modeling the frequency-domain waveform at a frequency point as the superposition of multiple exponential functions (poles), the Prony's and TKO dispersion extraction techniques essentially solve a polynomial function for the estimation of poles and, therefore, are considered as being search-free (no need for searching for slowness peaks). Although computationally efficient and widely accepted by the oil and gas industry, these techniques may be sensitive to a preset acoustic mode number. Such performance sensitivity to the preset mode number exists even in the noise-free case and can be significantly amplified in the presence of noise in the data.

Figure 3D:
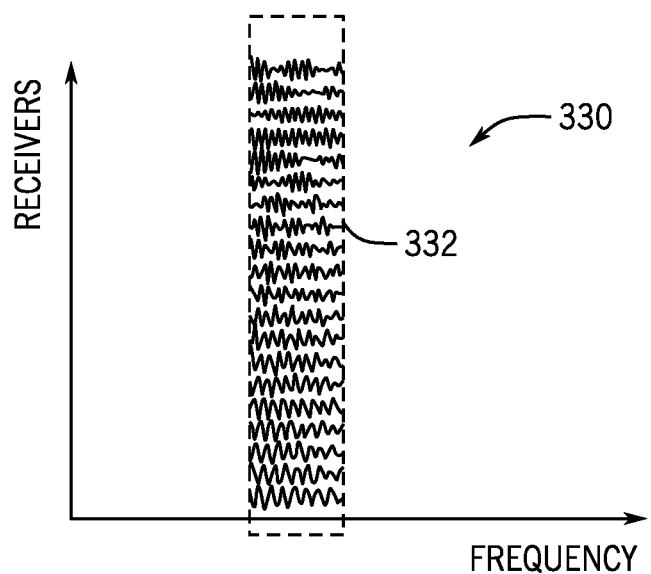
FIG. 3D illustrates a multiple frequency space-frequency band associated with a broadband dispersion extraction technique according to an example implementation.

Referring to FIG. 3D, as depicted in illustration 330, the broadband technique collects the array data from a chosen frequency window, or band 332, which contains multiple contiguous, or adjacent, frequencies. Thus, instead of using a single frequency point, the broadband technique simultaneously estimates the phase slowness and group slowness from the broadband array data. With more data processed at one time, the broadband technique is able to deliver robust slowness estimates with small fluctuation from one frequency to another, high-resolution slowness estimates, and better performance especially at low SNRs. Along this direction, the broadband maximum likelihood (ML) technique may be used, but, this technique has to solve a 2P-dimensional nonlinear optimization for P acoustic modes. Alternatively, the l-1 norm may be used, together with the l-2 fitting criterion, to regularize the slowness estimates towards a sparse solution. The determination of the regularization parameter may consume additional computational time. As another alternative, the broadband technique may utilize the sparse Bayesian learning (SBL) framework for the multiple measurement vector (MMV) model in an automated way to exploit the mode sparsity.

In accordance with further example implementations, another frequency-domain broadband dispersion extraction technique (called the "broadband spatial smoothing-Capon" or "BBSS-Capon" dispersion extraction technique herein) may be used, which has a relatively superior tradeoff between performance and computational complexity. More specifically, in accordance with example implementations, the BBSS-Capon technique takes full advantage of the robustness of the broadband Capon technique by processing the acoustic waveforms at multiple frequency points and for the high resolution in the slowness estimation. The BBSS-Capon technique, unlike the traditional Capon dispersion extraction, leverages spatial smoothing to reduce its high demand of frequency-domain waveforms for the covariance matrix estimation.

Figure 4:
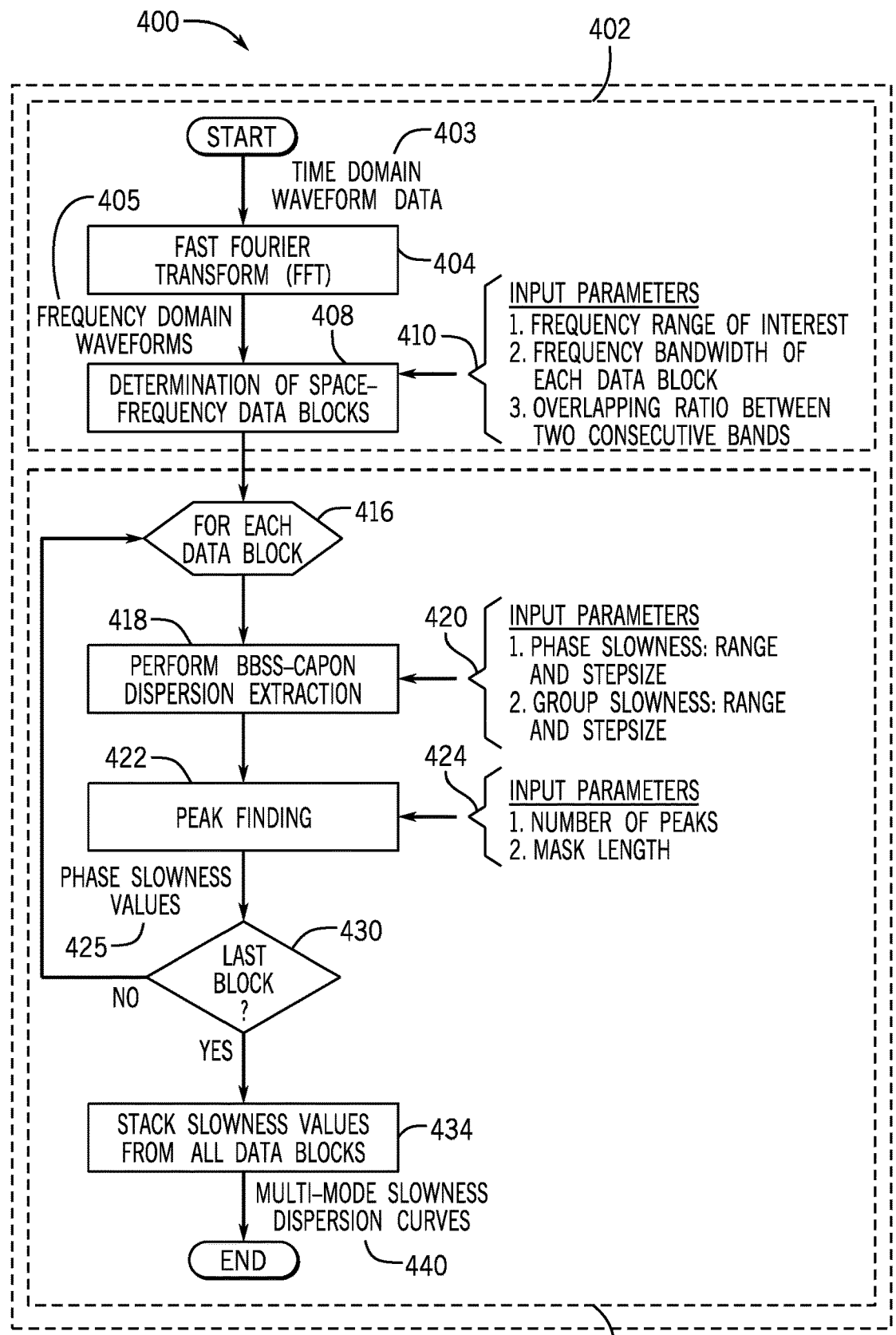
FIG. 4 is a flow diagram depicting a broadband spatial smoothing-Capon method (BBSS-Capon)-based multiple mode dispersion extraction technique according to an example implementation.

The overall BBSS-Capon based workflow for the dispersion extraction is generally depicted by a technique 400 of FIG. 4. Referring to FIG. 4, the technique 400 includes processing (block 402) time domain waveform data 403 to parse the data into space-frequency blocks, and the technique 400 includes processing (block 414) the space-frequency block to derive multiple mode slowness dispersion curves 440.

More specifically, in accordance with example implementations, the technique 400 first includes processing the time domain waveform data 403 to Fast Fourier transform (FFT) the data, pursuant to block 404, to produce frequency domain waveforms 405. In accordance with some implementations, the FFT may be determined as follows:

$$y_l(w) = FFT(y_l(t)), l = 1, 2, L, L,\qquad\text{Eq. 1}$$

where $y_l(t)$ represents the time-domain acoustic waveform at receiver l; $y_l(\omega)$ represents the frequency-domain complex waveform at frequency ω and receiver l; and "L" represents the number of receivers.

Next, pursuant to the technique 400, the space frequency domain is divided, or partitioned, pursuant to block 408, to produce space-frequency blocks. The space-frequency blocks correspond to, for example, the window 332 illustrated in FIG. 3D. In accordance with example implementations, the space-frequency data blocks are determined according to input parameters 410, such as, for example, the frequency range of interest, the bandwidth of each data block and the overlapping ratio between two adjacent, or consecutive, frequency data blocks. The space-data blocks may or may not be overlapping in frequency and/or space, depending on the particular implementation.

After subdividing the space into the frequency data blocks, the technique 400 next performs the following iteration over each of the data blocks. In this manner, for each data block (as represented at reference numeral 416), the technique 400 includes applying (block 418) the BBSS-Capon dispersion extraction to obtain a two-dimensional (2-D) or a one-dimensional (1-D) Capon spectrum (cost function) over the selected ranges of phase slowness and/or group slownesses, (based on input parameters 420), as further described herein. Next, the technique 400 includes applying a peak finding algorithm (block 422) based on such input parameters 424, such as the number of peaks to be found and a mask length. The peak finding algorithm identifies the peaks, which are the slowness values 425 for the space-data block. More iterations are performed if there are unprocessed space-frequency blocks (decision block 430). Lastly, after the space-frequency blocks have been processed, the phase slowness values for the blocks are stacked (block 434) to derive the multiple mode slowness dispersions 440.

In accordance with example implementations, for each space-frequency data block Y, the block Y may be represented as follows:

$$Y = [y(\omega_{-F}), \ldots, y(\omega_0), \ldots, y(\omega_F)] \qquad \text{Eq. 2}$$

where "$y(\omega)=[y_1(\omega), y_2(\omega), \ldots, y_L(\omega)]^T$" represents an L×1 vector and collects the array waveforms from L receivers at frequency $\omega$; the superscript "T" represents the vector transpose; and, without loss of generality, it is assumed that the data block Y includes waveforms from 2F+1 frequency points centered at $\omega_0$.

Figure 5:
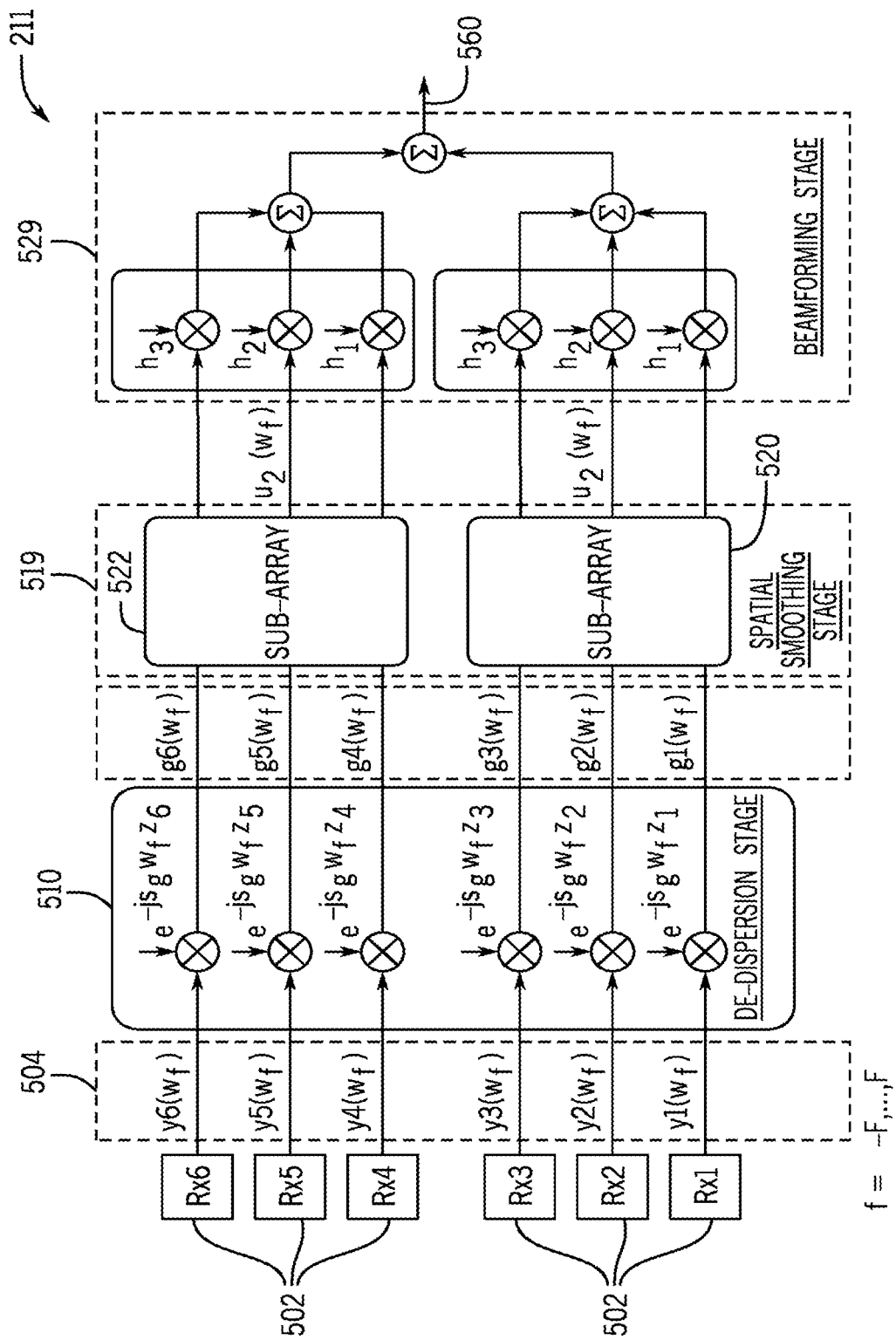
FIG. 5 is a schematic diagram of a dispersion extraction engine of FIG. 2 according to an example implementation.

Referring to FIG. 5 in conjunction with FIG. 2, in accordance with example implementations, the BBSS-Capon engine 211 may include three stages: a de-dispersion stage 510, a spatial smoothing stage 519 and a beamforming stage 529. As depicted in FIG. 5, the BBSS-Capon technique considers frequency domain waveforms 504 that are derived from data acquired by a set of receivers 502, and the frequency domain waveforms are evaluated over 2●F frequencies, indexed by "f": $^-$F to F.

For the de-dispersion stage 510, for the array waveform $y(\omega_f)$ 514 at each frequency $\omega_f$, a candidate group slowness $s_g$ is used to remove the mode dispersion in the wavenumber domain. Mathematically, de-dispersion may be described as follows:

$$g(s_g, w_f) = E^H(s_g, w_f) y(w_f) f = -F, L, 0, L, F \qquad \text{Eq. 3}$$

where $E^H(s_g, \omega_f)$=diag $\{e^{js_g\omega_f z_1} e^{js_g\omega_f z_2} \ldots e^{js_g\omega_f z_L}\}$ represents a diagonal matrix with $z_l$ denoting the distance between the transmitter and the l-th receiver.

The spatial smoothing stage 519 contains sub-array units, such as the depicted sub-array units 520 and 522, to selectively combines the data along the receiver offset direction to form sub-vectors. For a given $g(s_g,\omega_f)$, $g(s_g,w_f)$ multiple sub-vectors are formed according to a chosen sub-vector length M. In accordance with example implementations, the maximally overlapping sub-vectors may be chosen, in accordance with example implementations, maximally overlapping sub-vectors may be selected as follows:

$$u_n(s_g,\omega_f)=[g_n(s_g,\omega_f),g_{n+1}(s_g,\omega_f), \ldots, g_{n+M-1}(s_g,\omega_f)]^T,$$
$$n=1,2,\ldots,L+M-1, \qquad \text{Eq. 4}$$

where $g_n(s_g,\omega_f)$, represents the n-th element in the de-dispersed vector $g(s_g,\omega_f)$. It is noted that, given the sub-vector length, the number of sub-vectors is L+M-1.

For the beamforming stage 529, Capon beamforming is applied to all de-dispersed sub-vectors over multiple frequency points $\{u_n(s_g,\omega_f)\}f=-F, \ldots, F^{n=1, \ldots, L+M-1}$, by minimizing the sum of output energy while passing the desired sub-vector signal distortionless. The Capon spectrum, which is provided at an output 560 of the beamforming stage 529, may be expressed as follows:

$$\ell(s_p, s_g) = \frac{1}{s^H(s_p - s_g)\left[\sum_{f=-F}^{F}\sum_{n=1}^{L-M-1} u_n(s_g, \omega_f)u_n^H(s_g, \omega_f)\right]s(s_p - s_g)s(s_p - s_g)} \qquad \text{Eq. 5}$$

where $s(s_p - s_g) = [e^{j(s_p-s_g)w_0 z_1}, e^{j(s_p-s_g)w_0 z_2}, L, e^{j(s_p-s_g)w_0 z_M}]^T$ with a candidate phase slowness $s_p$.

It is noted that in accordance with further example implementations, other beamforming techniques may be applied, such as amplitude phase estimation (APES).

Other implementations are contemplated, which are within the scope of the appended claims. For example, although the spatial smoothing described above discusses forward sub-vectors, in accordance with further example implementations, both forward and backward sub-vectors may be formed, as described below:

$$\text{forward sub}-\text{vectors}: \tilde{u}_n(s_g, \omega_f) = \qquad \text{Eq. 6}$$
$$\left[g_n(s_g, \omega_f), g_{n+1}(s_g, \omega_f), \ldots, g_{n+M-1}(s_g, \omega_f)\right]^T,$$

$$\text{backward sub}-\text{vectors}: \bar{u}_n(s_g, \omega_f) =$$
$$\left[g_{L-n+1}(s_g, \omega_f), g_{L-n}(s_g, \omega_f), \ldots, g_{L-n-M+2}(s_g, \omega_f)\right]^T,$$

$$n = 1, 2, \ldots, L + M - 1$$

Then, the BBSS-Capon spectrum may be computed as follows:

$$|s_p, s_g = \frac{1}{s^H(s_p - s_g)R^{-1}(s_g)s(s_p - s_g)} \qquad \text{Eq. 7}$$

where

-continued $$R(s_g) = \frac{R_f(s_g) + R_b(s_g)}{2} = \frac{R_f(s_g) + JR_f^T(s_g)J}{2} \quad \text{Eq. 8}$$

with $$R_f(s_g) = \sum_{f=F}^{F} \sum_{n=1}^{L-M+1} \bar{u}_n(s_g, \omega_f)\bar{u}_n^H(s_g, \omega_f) \quad \text{Eq. 9}$$

$$R_b(s_g) = \sum_{f=F}^{F} \sum_{n=1}^{L-M+1} \bar{u}_n(s_g, \omega_f)\bar{u}_n^H(s_g, \omega_f)$$

and J as the exchanging matrix with one at its anti-diagonal elements and zero elsewhere.

Figure 6A:
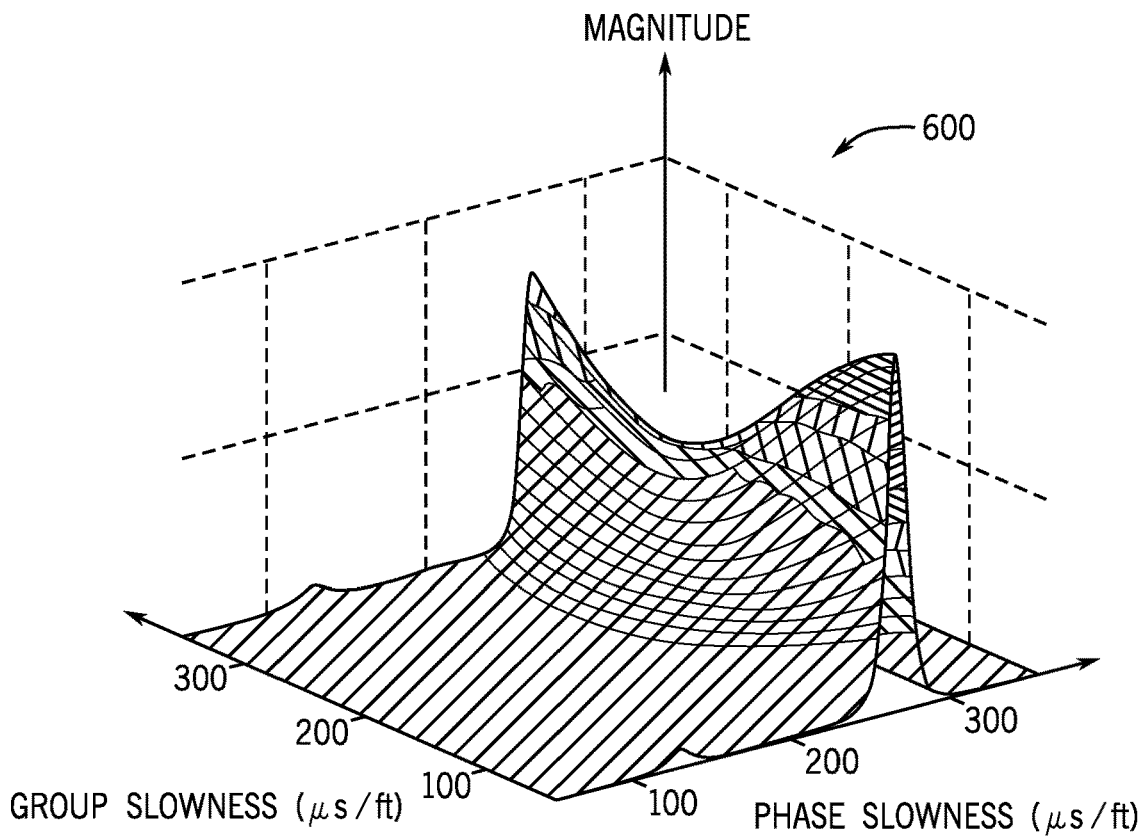
FIG. 6A is an illustration of a two-dimensional (2-D) Capon spectrum derived from a space-frequency data block according to an example implementation.
Figure 6B:
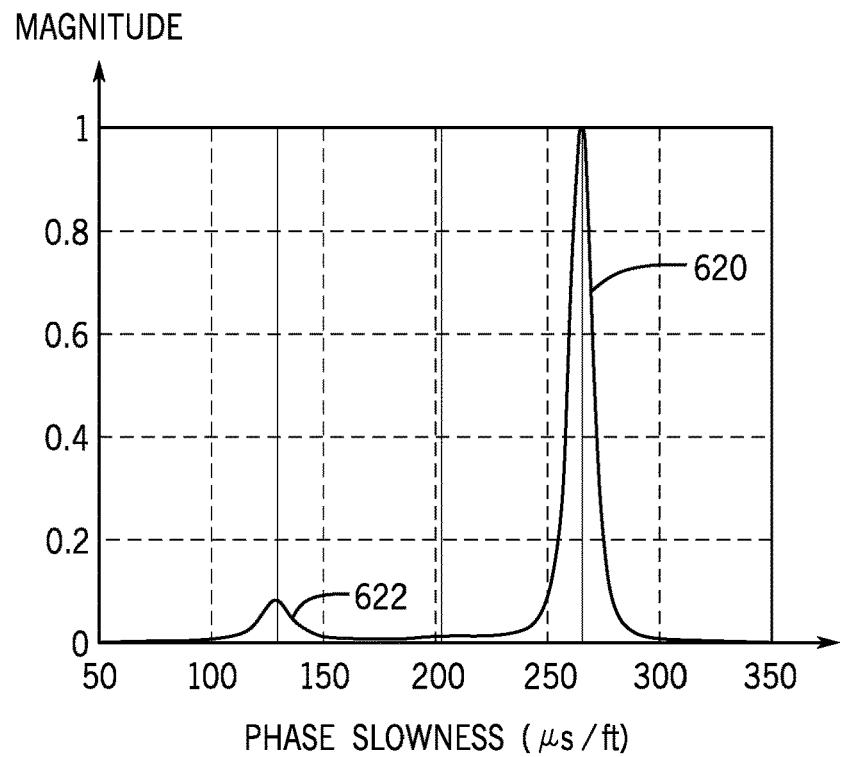
FIG. 6B is an illustration of a one-dimensional (1-D) Capon spectrum derived by integrating the 2-D Capon spectrum of FIG. 6A with respect to group slowness according to an example implementation.

From Eqs. 5 and 7, the Capan spectrum is a two-dimensional function over the phase and group slownesses. As depicted in FIG. 6A, a 2-D spectrum 600 is depicted for an LWD acoustic measurement tool that has thirteen receivers. As can be seen from FIG. 6A, the spectrum 600 is more focused along the phase slowness than the group slowness. Therefore, in accordance with example implementations, the 2-D Capon spectrum may be integrated along the group slowness to construct a 1-D Capon spectrum, such as the Capon spectrum that is depicted in FIG. 6B.

The peak finder 213 (FIG. 2) of the dispersion extraction engine 210 (FIG. 2) may, in accordance with example implementations, apply a peak finding algorithm to the 1-D Capon spectrum for each space-frequency data block. The extracted peak locations in the phase slowness domain yield the estimates of the multi-mode dispersion at the center frequency. For example, for the example 1-D Capon spectrum of FIG. 6B, peaks 622 and 620 correspond to values for two extracted dispersions. By stacking the dispersion estimates from all center frequencies, the dispersion extraction engine 210 may generate extracted global dispersions according to a pre-selected acoustic mode order.

Figure 7:
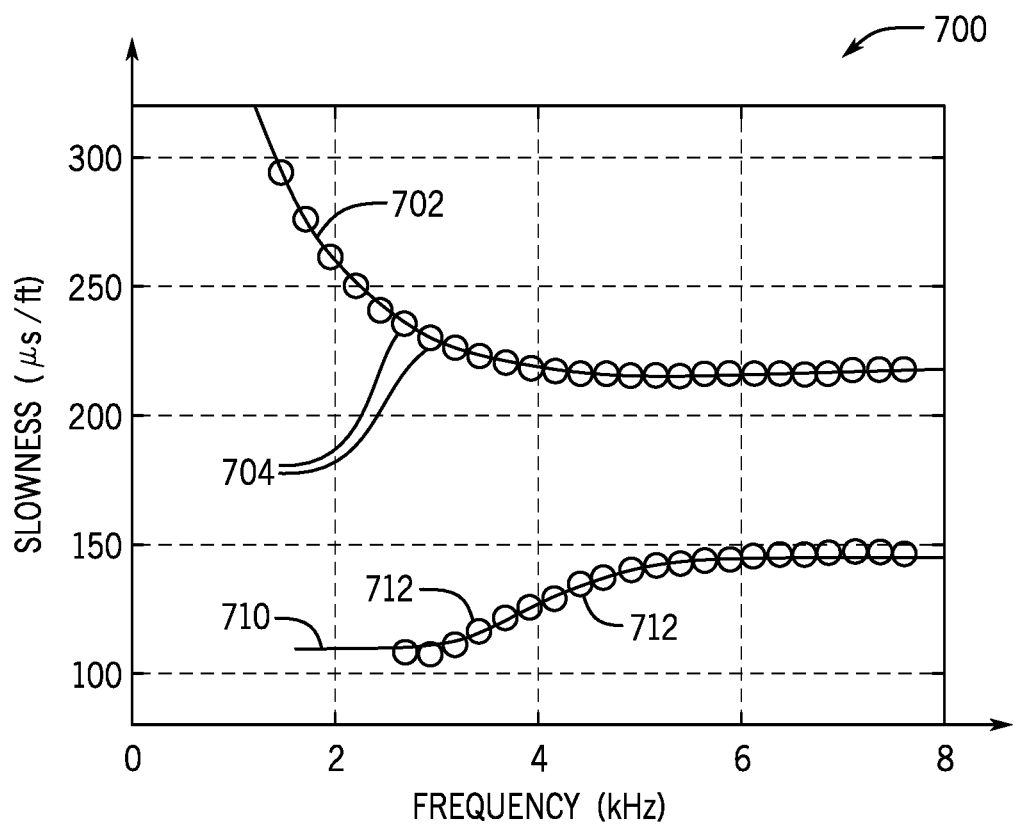
FIG. 7 is an illustration of slowness dispersion curves for multiple acoustic modes obtained using BBSS-Capon-based dispersion extraction according to an example implementation.

FIG. 7 depicts an illustration 700 of slowness values (represented by circles) derived using the BBSS-Capon technique. In this regard, as depicted in FIG. 7, certain slowness values 704 are associated with a tool flexural dispersion (represented by a solid black line 702) and other slowness values 712 are associated with a tool flexural dispersion (represented by a solid black line 710). The BBSS-Capon technique, in accordance with example implementations, may be more stable for the tool and formation flexural dispersions for lower frequencies (frequencies below 3 kH$_z$, for example), in accordance with example implementations.

Referring back to FIG. 2, in accordance with example implementations, the dispersion post-processing engine 220 may be used to label the raw slowness values, identify potential acoustic modes, and select slowness-frequency input pairs from the identified acoustic modes for purposes of allowing the shear slowness to be determined by either the model-based inversion engine 230 or the low frequency formation flexural asymptote engine 238. In particular, the dispersion post processing engine 220 may sort the slowness values to label and separate the formation flexural dispersion from the other dispersions, in accordance with example implementations.

In general, there are various options for selection, or identification, of the slowness-frequency input pairs. As a more specific example, in accordance with some implementations, the selection of the slowness-frequency input pairs may be performed by a human user. For example, the user may select specific slowness-frequency inputs of the extracted formation flexural dispersion and possibly other extracted dispersions based on the user's inspection of the extracted dispersions. One way, for example, may be for the user to identify a frequency band that is associated with a high sensitivity to the shear slowness and, at the same time, is associated with a low estimation uncertainty; and the user may then select slowness estimates in the identified frequency band.

In accordance with example implementations, another way to select, or identify, the slowness-frequency input pairs is for the dispersion post-processing engine 220 to numerically determine sensitivities of the extracted dispersions to the shear slowness as a function of frequency. Based on the numerically-computed sensitivities, slowness-frequency inputs may then be selected (automatically or with human input, for example), which show relatively high sensitivities to shear slowness.

In accordance with example implementations, the slowness-frequency input pairs may be selected based on energy, in a similar manner to selecting inputs for wireline acoustic model-based inversion. Using this technique, the dispersion post-processing engine 220 may identify a frequency that is associated with the largest energy of the extracted formation flexural dispersion. Then, for a given frequency bandwidth or a desired number of inputs, the slowness-frequency input pairs may be selected around the frequency that was identified as being associated with the largest energy.

The user-specified option may not be well-suited for the automated processing of borehole acoustic logging. Moreover, the sensitivity option may yield a relatively large inversion error without taking into account the dispersion estimation errors. The energy option may encounter challenges, as two coupled flexural modes are present and the energy (or spectrum amplitudes) of the formation mode is not the only factor determining the uncertainty of the dispersion estimation of the formation flexural mode. In other words, the accuracy of the dispersion estimation for the formation flexural dispersion depends on not only the noise but also on the tool flexural dispersion.

In accordance with example implementations, a frequency-varying uncertainty is calculated for each of the extracted dispersions. More specifically, in accordance with example implementations, Cramér-Rao bounds (CRB) are determined for dispersions extracted using both narrowband and broadband (multi-frequency) dispersion extraction techniques. More specifically, for each extracted dispersion value, a CRB-based error bar may be determined.

The CRB-based error bar option is based on the study of the CRB on the broadband dispersion extraction, which provides a guideline on how the estimation accuracy of multiple modes (e.g., the tool and formation flexural modes) evolves from one frequency to another. The error-bar option is a two-step approach: first, a large frequency interval where the sensitivity of the dispersion to the shear slowness is above a certain threshold is selected; and then, slowness estimates (possibly discrete, not necessary continuous) are selected within the selected frequency interval, which are associated with relatively small estimation error bars.

It is often the case that, at low frequencies, the sensitivity is high while the estimation errors at low frequencies are large. As a result, there is a trade-off between the sensitivity and estimation uncertainty. The CRB-based option provides a statistical way to describe such a trade-off.

In accordance with example implementations, the CRB error bars may be derived for the broadband dispersion extraction of multiple acoustic modes as follows. In general, the CRB provides a unified analysis of the best achievable performance of any unbiased estimator of the dispersion in terms of the variance of estimator. The error bar is then computed as the square root of the derived CRB. The derived CRB is applicable to scenarios with both narrowband (single-frequency) and broadband (multi-frequency) settings, and with single (e.g., in wireline acoustics) or multiple (e.g., in LWD acoustics) modes. With the derived CRB, the noise effect may be analyzed on the slowness estimates of (tool/formation) flexural modes, and the impact of the tool flexural mode on the dispersion estimation of the formation flexural mode (or vice versa). Therefore, the CRB may describe the uncertainty of the dispersion estimation, especially for the formation flexural mode, more accurately than the energy option which only uses the amplitude estimation of the formation flexural mode.

The derived CRB shows a dependence on the number of modes, the number of frequency points used for the dispersion estimation, the source-to-receiver geometry (i.e., the source-to-first receiver distance, the inter-element spacing, and the array aperture), the local SNR at each frequency point, and the attenuation (if present) and the slowness dispersion themselves. The derived results include the CRB in the case of the narrowband (single-frequency) dispersion extraction as a special case.

Mathematically, the CRB on the phase and group slowness estimates may be determined via the help of the block matrix inverse form, as described below:

$$CRB(\theta_2) = diag\{(J_{\theta_2\theta_2} - J_{\theta_2\theta_2}J_{\theta_2\theta_2}^{-1}J_{\theta_2\theta_2}^{T})^{-1}\}$$

$$= diag\left\{\left(J_{\theta_2\theta_2} - \sum_{f=F}^{F} J_{\theta_2\theta_2}J_{\theta_2\theta_2}^{-1}J_{\theta_2\theta_2}^{T}\right)^{-1}\right\}$$

Eq. 10 where "$q_g$" represents the global parameter set including the phase slowness, group slowness, the attenuation, and the attenuation rate; "$q_l$" represents the local parameter set, including the signal amplitudes and noise variances at all frequencies within the chosen frequency band; and "J" denotes the Fisher Information matrix (FIM). The FIM of the auto blocks and cross blocks of $q_g$ and $q_l$ may be computed from the signal and noise parameters; and, hence, the CRB described in Eq. 10 may be simplified and directly computed from the signal and noise parameters. In accordance with example implementations, the dispersion post-processing engine 220 numerically computes the CRB-based error bars for the extracted slowness dispersions.

For an LWD acoustic measurement tool, the dipole source may excite both the tool and formation flexural modes over a certain frequency range, and the tool flexural mode may dominate the formation flexural mode over this frequency range. For the following, it is assumed that the measurements are acquired by the receivers of the acoustic measurement tool in a fast formation. FIG. 8D depicts an example spectrum 870 for the fast formation. In particular, FIG. 8D depicts spectrums 872, 876 and 874 for the tool, formation and noise variance, respectively. With these parameters, the error bars may be numerically determined on the extracted dispersions in terms of the square root of their CRBs.

Figure 8A:
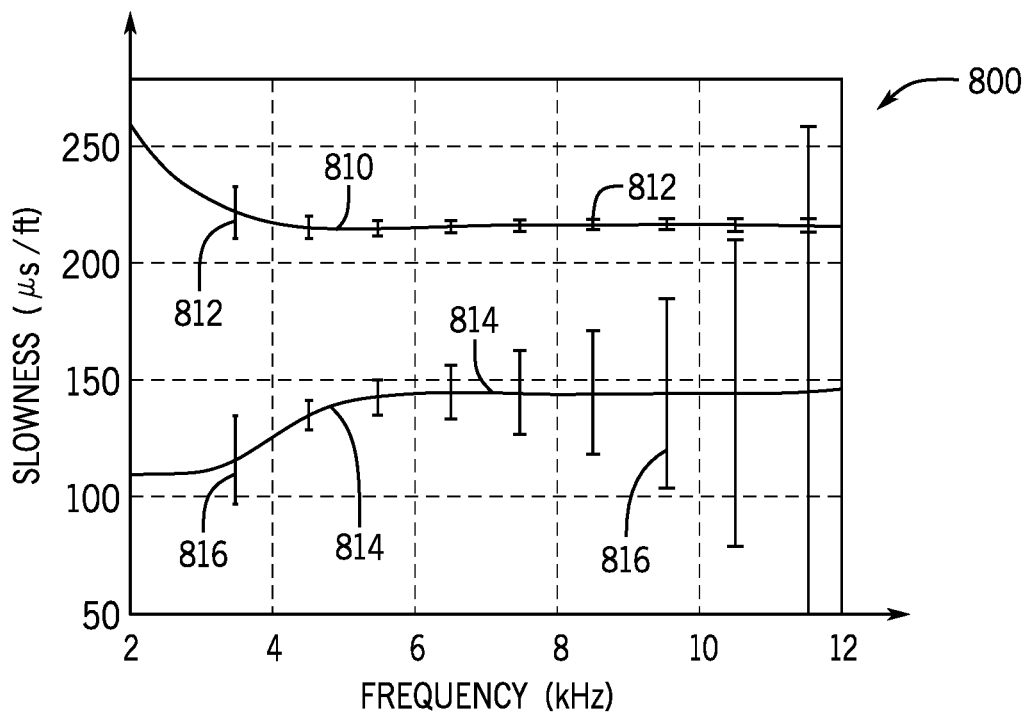
FIG. 8A is an illustration of Cramér-Rao bounds (CRB)-based error bars determined for multiple slowness dispersions extracted using narrowband processing according to an example implementation.

In particular, FIG. 8A is an illustration 800 of tool 810 and formation 814 flexural dispersions, which were extracted through narrowband processing. In this regard, FIG. 8A depicts error bars 812 for the tool flexural dispersion 810 and error bars 816 for the formation flexural dispersion 814.

Figure 8B:
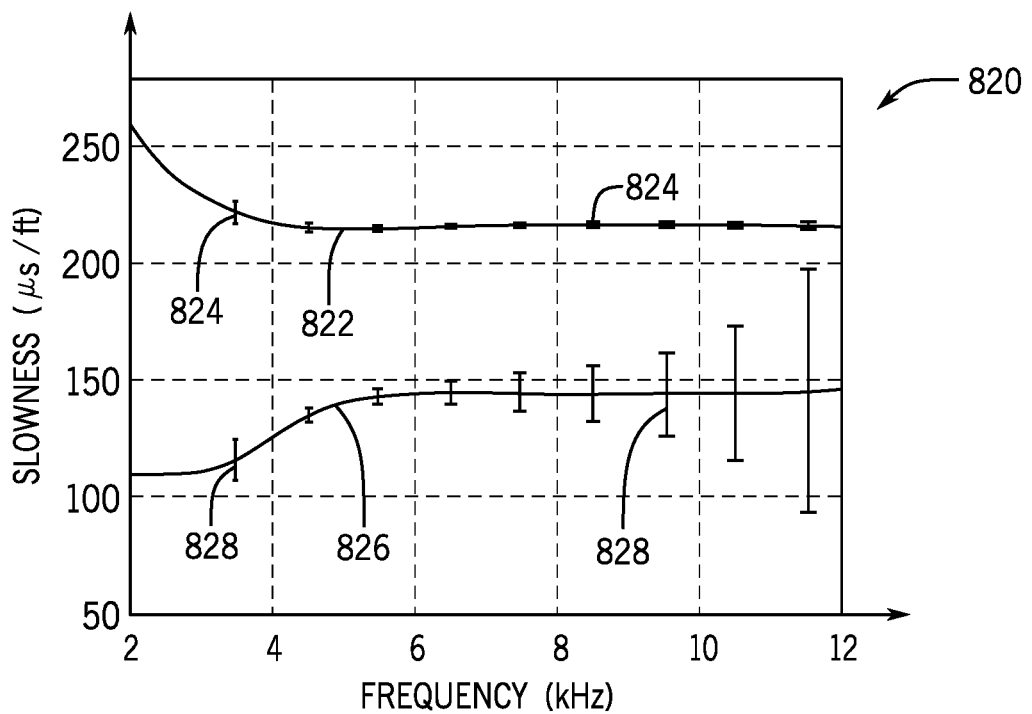
FIG. 8B is an illustration of CRB-based error bars determined for multiple slowness dispersions extracted using five frequency broadband processing according to an example implementation.

FIG. 8B is an illustration 820 of tool 822 and formation 826 flexural dispersions extracted through broadband processing, where five frequencies are used in the broadband window. As depicted in FIG. 8B, error bars 824 and 828 are determined for the tool 822 and formation 826 dispersions, respectively.

Figure 8C:
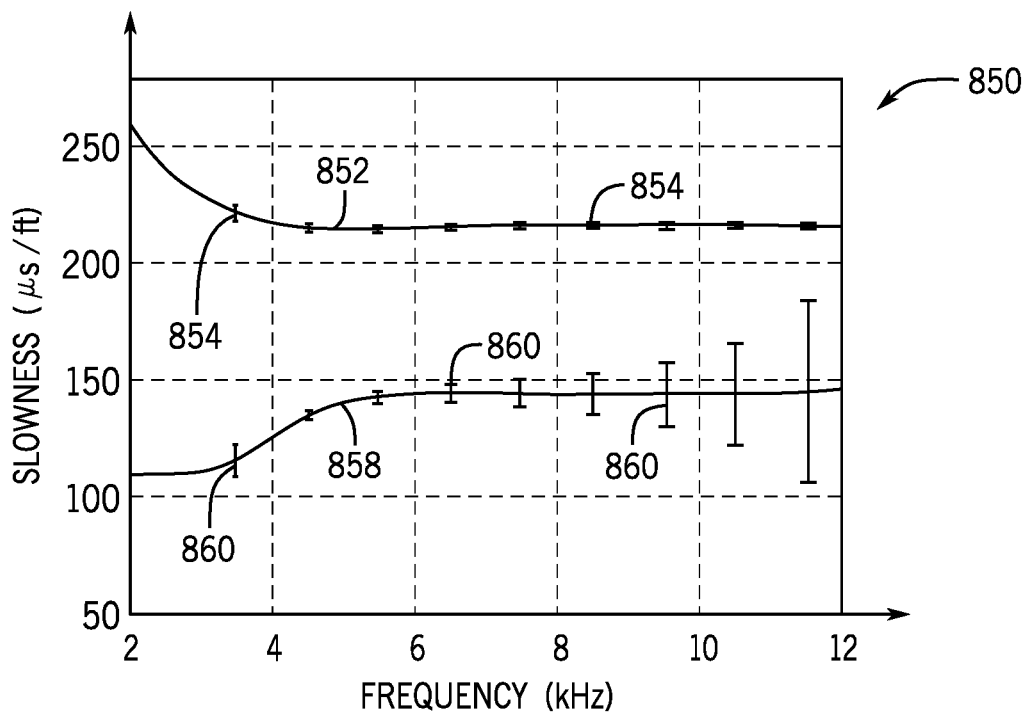
FIG. 8C is an illustration of CRB-based error bars determined for multiple slowness dispersions extracted using nine frequency broadband processing according to an example implementation.
Figure 8D:
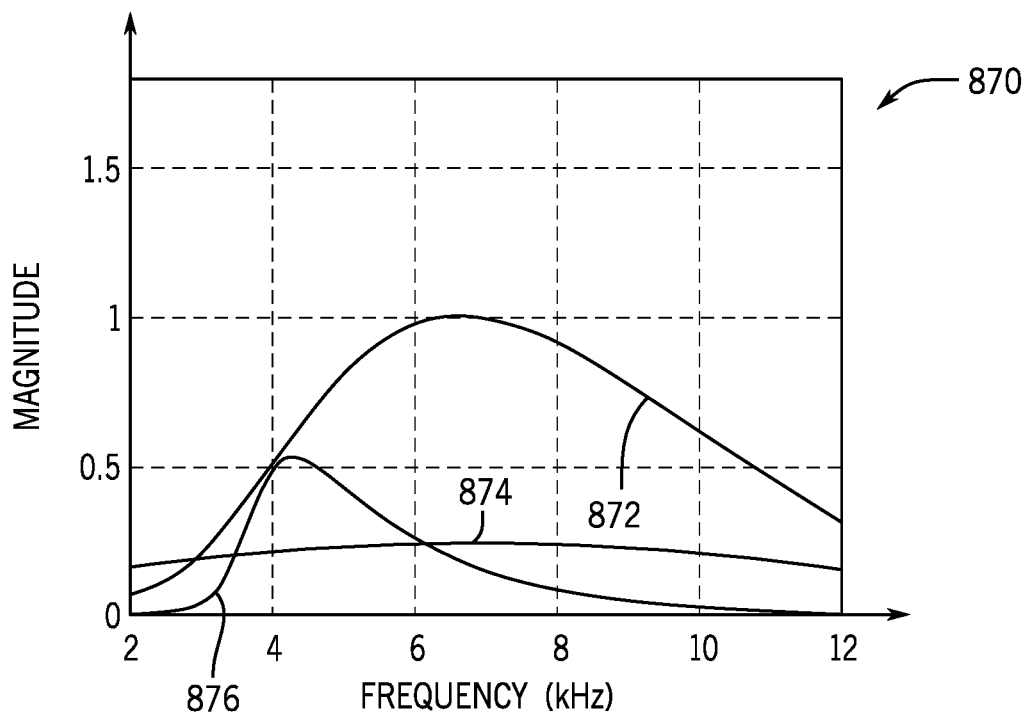
FIG. 8D is an illustration of an acoustic mode spectrum for a tool, a formation and a noise variance according to an example implementation.

FIG. 8C depicts an illustration 850 of tool 852 and formation 858 flexural dispersions extracted through broadband processing, where nine frequencies were used in the broadband window. As depicted in FIG. 8C, error bars 854 and 860 are determined for the tool 852 and formation 858 flexural dispersions, respectively.

As can be seen from a comparison of either FIG. 8B or FIG. 8C to FIG. 8A, the broadband approach gives smaller CRB error bars at all considered frequency points, as compared to the narrowband approach. FIGS. 8A-8C also depict how the error bars of the formation flexural dispersion estimation evolve from one frequency to another, which may serve as a guideline to select a proper set of slowness-frequency input pairs for the model-based inversion.

In accordance with example implementations, the parameters used for the CRB computation may be unknown in advance. For example, the tool and formation flexural dispersions and their amplitudes as well as the noise variance may be unknown parameters. In this case, these parameters may be replaced in the CRB computation by their estimates from the multi-mode dispersion extraction techniques. Together with other known parameters such as the array configuration parameters (e.g., the source-to-receiver distance and the inter-receiver spacing), the CRB errors may be fully computed.

Figure 9A:
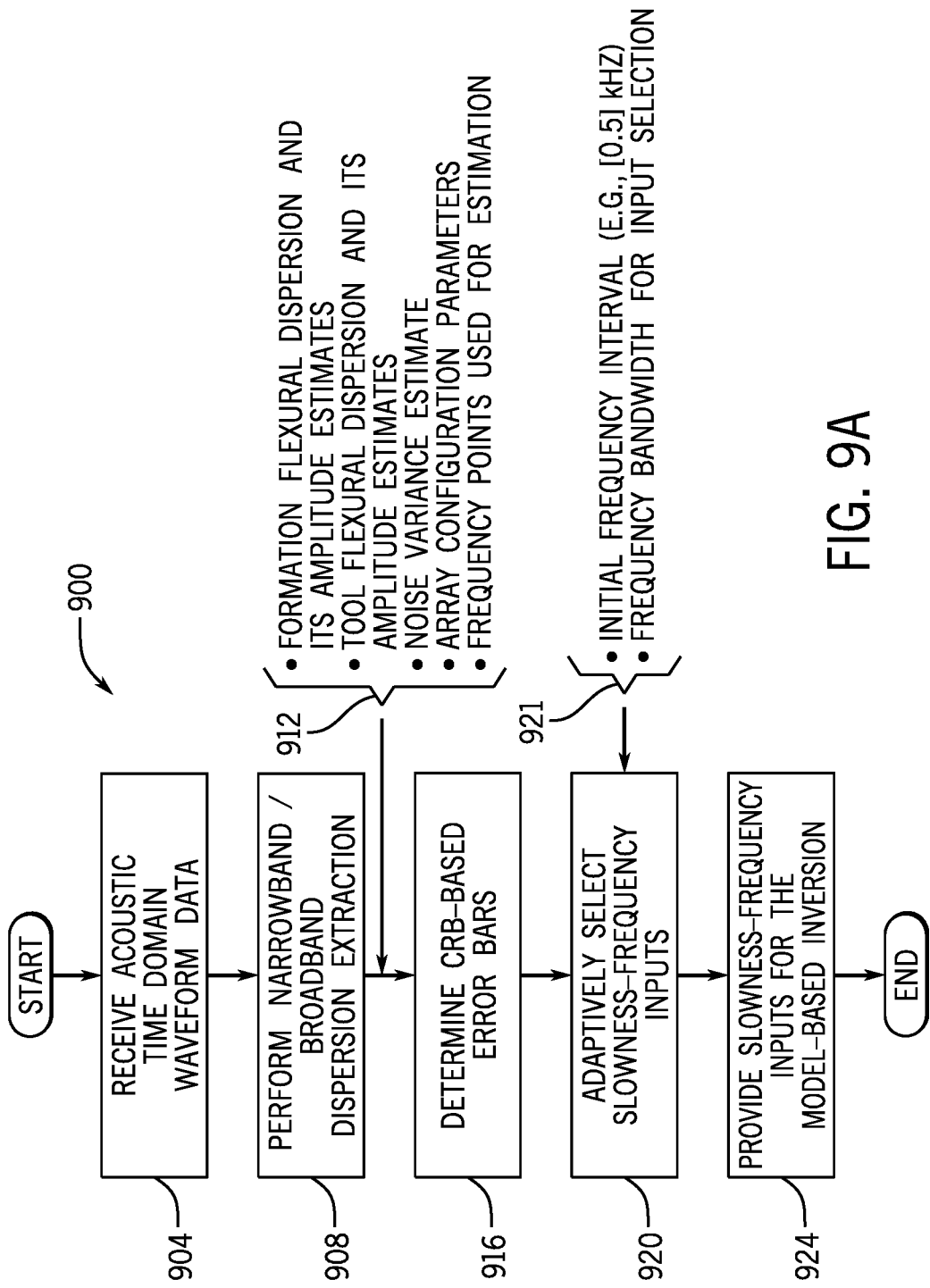
FIG. 9A is a flow diagram depicting a CRB-based approach to select slowness-frequency inputs for model-based inversion for shear slowness according to an example implementation.

FIG. 9A generally depicts a technique 900 for using the CRB-based option to adaptively select the slowness-frequency input pairs for model-based inversion. Referring to FIG. 9A, the technique 900 includes receiving (block 904) acoustic time domain waveform data (due to the firing of a dipole source) and performing (block 908) narrowband or broadband dispersion extraction. Next, CRB-based error bars are determined, pursuant to block 916. It is noted that this determination may be based on inputs 912, such as the formation flexural dispersion and its amplitude estimates; tool flexural dispersion and its amplitude estimates; a noise variance estimate; array configuration parameters; and frequency points used for the estimation.

Slowness-frequency inputs may then be adaptively selected based at least in part on the CRB error bars, pursuant to block 920. This selection may include, in accordance with example implementations, user-selected parameters 921, such as, for example, an initial frequency interval and a frequency bandwidth for input selection. The slowness-frequency input pairs may then be provided, pursuant to block 924, for model-based inversion.

Figure 9B:
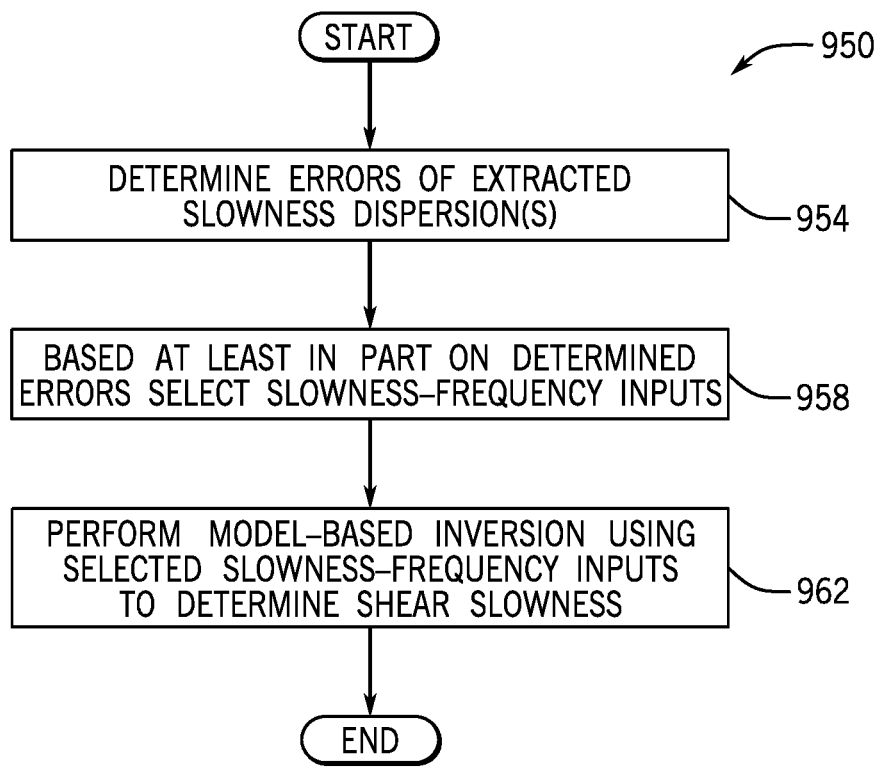
FIG. 9B is a flow diagram depicting a technique to select frequency-slowness inputs for model-based inversion for shear slowness using a calculated uncertainty for extracted dispersion values according to an example implementation.

Thus, in general, a technique 950 that is depicted in FIG. 9B may be used. The technique 950 includes determining (block 954) errors associated with one or multiple extracted slowness dispersions, and based at least in part on the determined errors, selecting slowness-frequency inputs, pursuant to block 958. Model-based inversion may then be performed using the selected slowness-frequency inputs to determine dipole shear slowness, pursuant to block 962.

In accordance with further example implementations, a heuristic option may be used to adaptively select the slowness-frequency input pairs by using dispersion extractions derived from multiple dipole (inline and/or crossline) waveform channels. The multiple dipole channels may be due to the firings of multiple dipole sources or due to multiple firings of the same dipole source. For the latter case, a given dipole source may be fired at different positions in the wellbore, such that the inline and crossline positions of the dipole source varies for both firings, as depicted at reference numerals 1010 and 1060 of FIG. 10.

More specifically, the use of the multiple firings of the dipole source to select the slowness-frequency inputs may proceed as follows, in accordance with example implementations. In general, the same philosophy of the CRB-based option is followed, by taking into account both the sensitivity and dispersion estimation uncertainty for the slowness-frequency selection. Here, instead of using a statistical measure of the trade-off, the diversity of the dispersion estimation from the two (or multiple) dipole waveform channels are used. Specifically, the most consistent formation flexural dispersion estimates are selected using two independent inline waveforms from two separate dipole firings (denoted as D1 and D2 and illustrated at reference numerals 1010 and 1060 in FIG. 10), subject to some sensitivity constraints between the D1-inline and D2-inline channels. For example, the sensitivity constraints may include an initial frequency window, a bandwidth, a maximum allowable slowness difference, and so forth.

There may be multiple reasons for heuristically selecting the slowness-frequency input pairs. For example, with the user specified frequency window, the selection of the dispersion inputs at the high-frequency region may be avoided. As such, the dispersion estimates at the low-frequency range may be allowed. This is supported by a sensitivity study showing that the sensitivity of the formational flexural dispersion is usually higher at the low-frequency region than at the high-frequency region. Moreover, the formation dispersion at the high-frequency region may be affected by near-wellbore damage, which may not be included in the model-based inversion.

Moreover, the heuristic option for selecting the slowness-frequency input pairs may be used because, within all possible formation dispersion inputs at the low-frequency region (specified by the above initial frequency window), consistently agreed dispersion estimates between the D1-Inline and D2-Inline indicate relatively good estimation accuracy and relatively high SNR at corresponding frequency points. In other words, at the low frequency region, if D1 and D2 give very different formation dispersion estimates at some frequency points, it indicates low SNRs in either channel or both at those frequencies.

Figure 10:
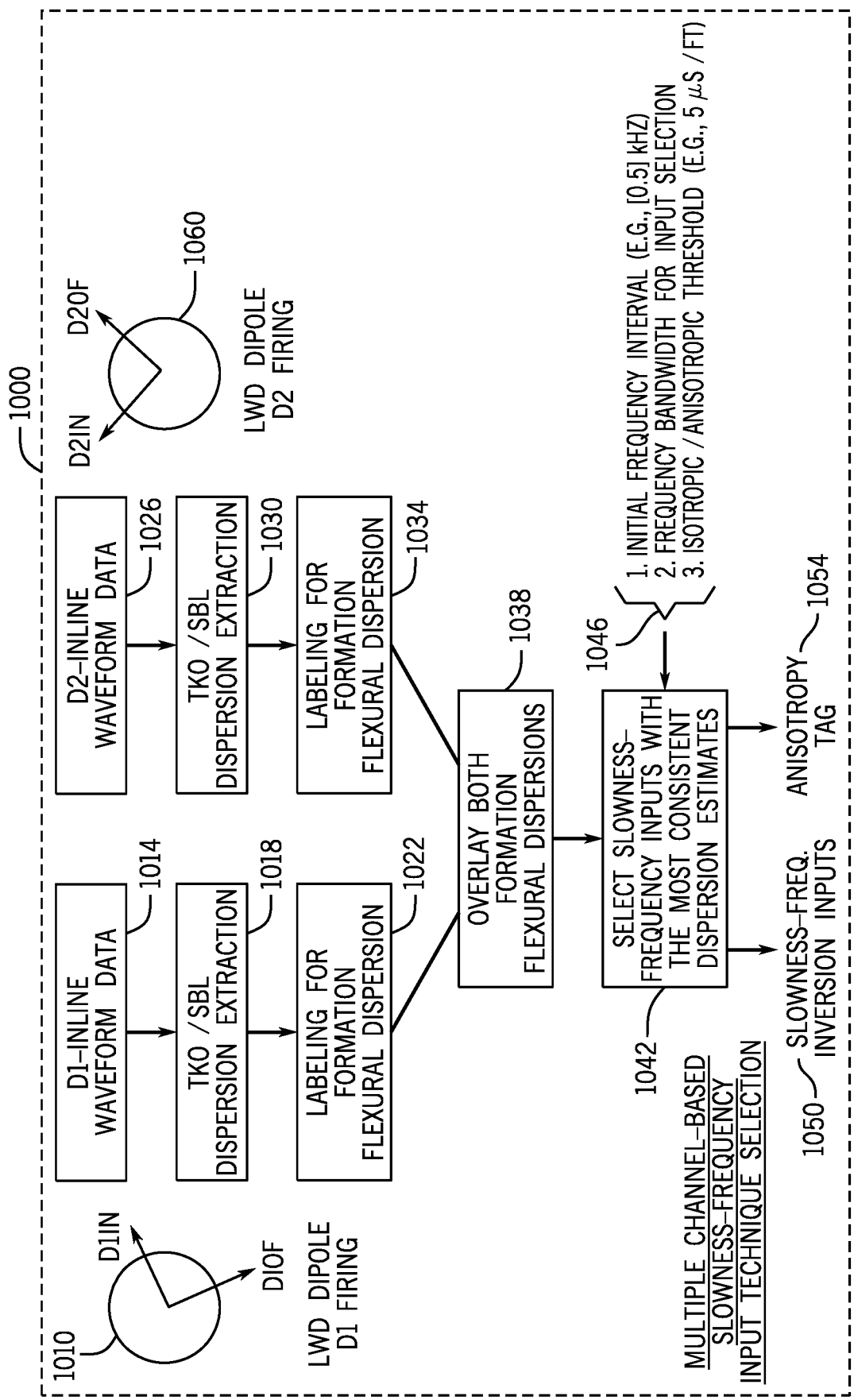
FIG. 10 is a flow diagram depicting a technique to identify slowness-frequency inputs for model-based inversion for shear slowness based on dispersion values extracted from data acquired for multiple dipole source firings according to an example implementation.

Referring to FIG. 10, as a more specific example, a technique 1000 for heuristically selecting the slowness-frequency input pairs includes receiving (block 1014) D1-Inline waveform data and receiving (block 1026) D2-Inline waveform data. Dispersion extraction techniques 1018 and 1030 are then used to extract the dispersions, from the waveform data, pursuant to blocks 1018 and 1030. Subsequently, the dispersion curves are labeled pursuant to blocks 1022 and 1034. The extracted formation flexural dispersions may then be overlayed, pursuant to block 1038. Next, the slowness-frequency input pairs may then be selected, pursuant to block 1042. In this manner, the slowness-frequency input pairs that are the most consistent dispersion estimates may be selected. Various user parameters 1046 may be considered, such as an initial frequency interval, a frequency bandwidth for input selection, isotropic/anisotropic thresholds, and so forth. Thus, the results of the slowness-frequency input selection are selected slowness-frequency inversion inputs 1050 and an anisotropy tag 1054.

The heuristic selection of the slowness-frequency inputs achieves a balance between the sensitivity (primarily by the initial frequency window specified by the user) and the SNR (controlled by the search for consistent dispersion estimates) in a more unsupervised way. It is noted that this adaptive scheme is immediately applicable to the homogenous isotropic formation, the vertical section of VTI formations, the horizontal section of HTI formations, and anisotropic formations. Moreover, slowness-frequency inputs for dispersions extracted from data acquired by a wireline-deployed acoustic measurement tool may also be heuristically selected in the same manner, in accordance with further example implementations.

Figure 11A:
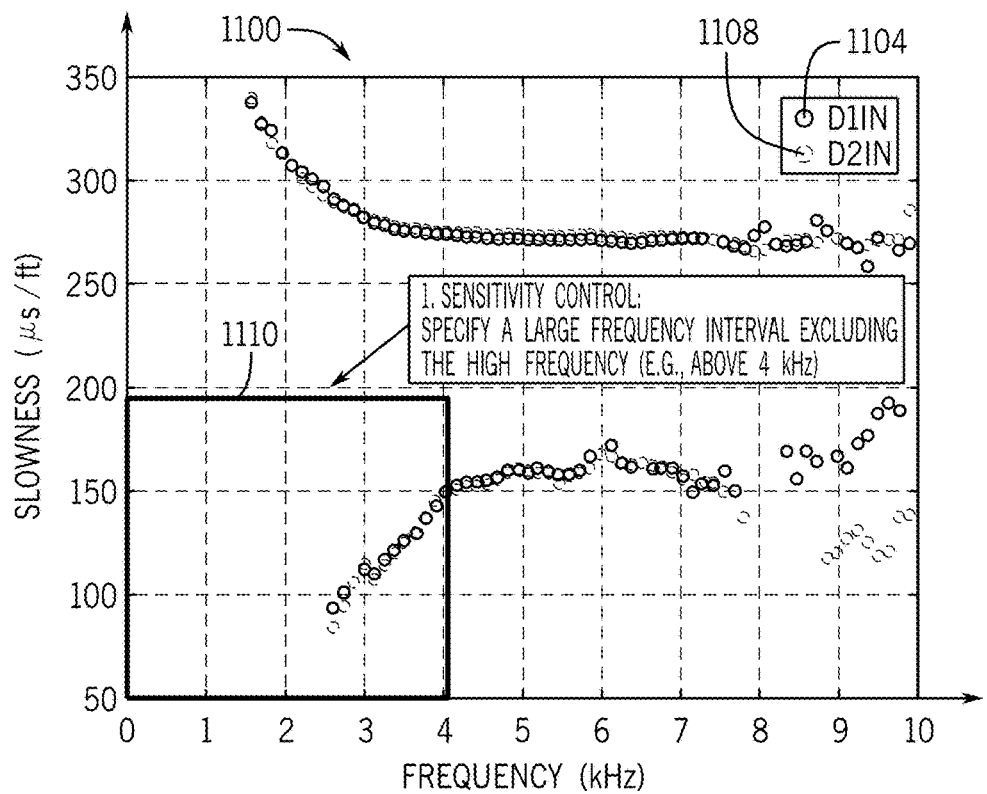
FIG. 11A is an illustration of the use of a sensitivity control to select slowness-frequency inputs for model-based inversion for shear slowness based on multiple dipole source firings according to an example implementation.
Figure 11B:
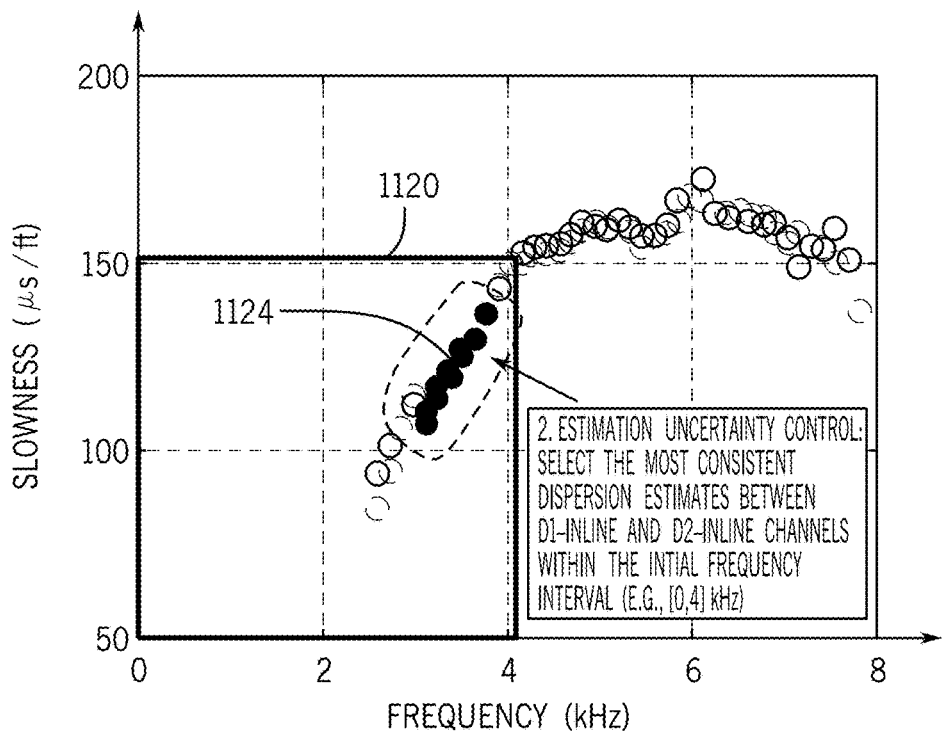
FIG. 11B is an illustration of the use of an uncertainty control to select slowness-frequency inputs for model-based inversion for shear slowness based on multiple dipole source firings according to an example implementation.

FIGS. 11A and 11B are illustrations 1100 and 1120, respectively, illustrating the heuristic slowness-frequency input pair selection option for one depth frame. After separately processing the two dipole inline waveform channels and extracting two corresponding formation flexural dispersions, the two dispersions are overlaid. The key in FIG. 11A illustrates the points 1104 and 1108 corresponding to the two dipole inline channels. As depicted in FIG. 11A, the first step is to assure a sufficient sensitivity level of the selected dispersion to the shear slowness by using a large frequency interval, which usually excludes the high frequency region for the sake of sufficient sensitivity. Sensitivity control is illustrated by box 1110 in FIG. 11A. Then, as depicted in FIG. 11B, the most consistent dispersion estimates, as illustrated at reference numeral 1124, are selected from the two dipole inline channels to select the dispersion estimates having a relatively small error of uncertainty.

Referring back to FIG. 2, as noted above, depending on such factors as the formation type (fast or slow) and the SNR, the system 200 may use the model-based conversion engine 230 or the low frequency formation flexural asymptote engine 238 to determine the dipole shear slowness. In accordance with example implementations, therefore, two schemes may be used to estimate the formation shear slowness: the first scheme is the use of the low-frequency asymptote of the formation flexural mode as it converges to the formation shear slowness in the fast formation; and the other scheme is a scheme that inverts the flexural dispersion at multiple frequency points by using a model-based approach, which explicitly takes into account the presence of the acoustic measurement tool in the borehole.

Assuming that the SNR is high and the formation is fast, it is possible to estimate the formation shear slowness from the low-frequency asymptote of the formation flexural dispersion, as it converges to the shear slowness at the low frequency. Using this relationship, the low frequency formation flexural asymptote engine 238 may use one of many different techniques to determine the shear slowness, such as for example, a technique that uses a Bessel function-based parametric estimator (SPI) or a hyper-tangent function-based parametric estimator; a technique that employs slowness-frequency analysis (SFA) at the low frequency; a technique that employs low-pass filtering, followed by non-dispersive STC to extract the low-frequency asymptote of the formation flexural dispersion. A synthetic example of this scheme is discussed further below using the SFA approach.

Although the technique used by the low frequency formation flexural asymptote engine 238 may be a data-driven approach, which is independent of any physical model, the extraction of low-frequency asymptote of the formation flexural mode in the fast formation may be a formidable task as its weak energy at the low-frequency region and the presence of strong drilling noise and tool flexural interference. Moreover, in the slow formation, the interference of the tool flexural mode to the formation flexural mode causes the low-frequency asymptote to no longer converge to the formation shear slowness. As a result, it is more reliable to make use of flexural dispersion with stronger energy and sufficient sensitivity to the shear slowness to estimate the formation shear slowness. To this end, a model-based inversion scheme to invert for the shear slowness by using the formation flexural dispersion, or the tool flexural dispersion, or both at multiple frequency points, is discussed further below.

Assuming a homogeneous and isotropic formation around the borehole, the model-based inversion algorithm explicitly takes into account the presence of a drill collar and utilizes the vanishing of a boundary condition determinant D as a requirement for the existence of a particular propagating borehole mode. This criterion may be used to construct a cost function that is minimized for optimal estimates of parameters of interest. Specifically, guided borehole modes, including both the tool and formation flexural modes, may be expressed in terms of the roots of a boundary condition determinant, which is described below:

$$D(k_Z, w, \overline{X}) = 0 \qquad \text{Eq. 11}$$

where "D" represents the determinant of the system matrix of the homogeneous linear system of equations that follows from matching the appropriate boundary conditions; "$k_z$" represents the wavenumber in the direction of propagation; "w" represents the angular frequency; and "$\overline{x}$" represents the vector that contains the geometrical and material parameters of the model, such as the formation shear slowness, formation compressional slowness, the formation bulk density, the mud compressional slowness, the mud density, the tool compressional and shear slownesses, and the tool density. When the parameter vector $\overline{x}$ is given in the model, solutions to Eq. 11 yield smooth curves in the wavenumber-frequency plane.

The modal dispersions are then obtained in the slowness-frequency domain by defining the phase slowness as Re$\{k_z\}$/w. Numerically, these dispersions can be calculated by finding roots of $k_z$ in Eq. 11 along a smooth curve in the w domain.

To solve the inverse problem, the model-based inversion algorithm uses the criterion of minimizing the boundary condition determinant D, at multiple frequency points to construct the cost function. Assuming M slowness-frequency inputs are selected, e.g., $\{k_{z_i}, w_i\}_{i=1}^{M}$, the inversion algorithm is to find N unknown components of $\overline{x}$ that minimize the following cost function without resorting to the dispersion curves explicitly, as described below:

$$\|\overline{e}(\overline{X})\|^2 = \sum_{i=1}^{M} |D(k_Z, W_i, \overline{X})|^2 \qquad \text{Eq. 12}$$

According to Eq. 11, the cost function expressed in Eq. 12 may be made zero by varying $\overline{x}$ for the case of noise-free data. For the noisy data, the least-square problem can be solved by applying the Gaussian-Newton method.

As discussed above, the selected slowness-frequency input pairs exhibit different estimation uncertainty due to varying SNRs at different frequency points and different sensitivity levels. The cost function of Eq. 12 may be extended to apply different weighting factors to the determinant of the system matrix at different frequency points. That is, the following cost function may be used:

$$\|\overline{e}(\overline{X})\|^2 = \sum_{i=1}^{M} |D(k_Z, w_i, \overline{X})|^2 \qquad \text{Eq. 13}$$

where "$a_i$" represents the weighting factor on the system matrix determinant at the frequency $w_i$. The selection of the weighting factors $a_i$ should take into account the sensitivity of the dispersion to the physical parameters and the estimation uncertainty of the dispersion estimation due to the noise.

In most cases, the number of inversion parameters N is less than the dimension of $\overline{x}$, since it may be assumed that some of its components may be obtained from other measurements. The primary interests, in accordance with example implementations, are the formation shear and borehole fluid slownesses. Therefore, N=1 when only the formation shear slowness is of interest, and N=2 when both parameters are inverted simultaneously.

Figure 12B:
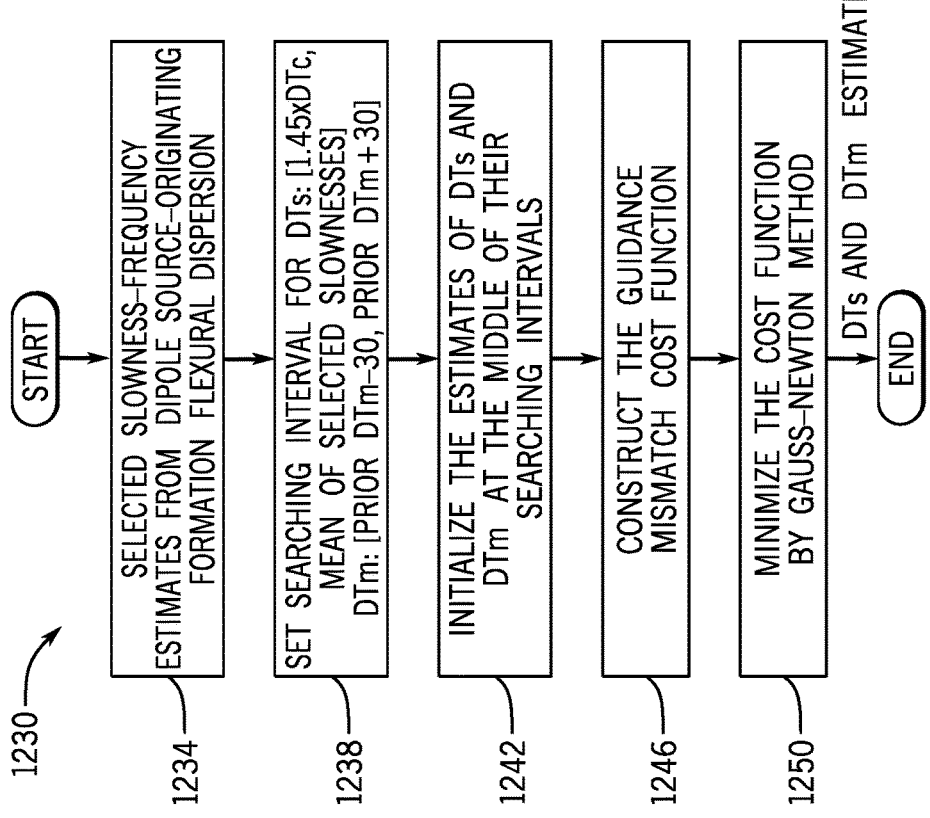
FIG. 12B is a flow diagram depicting a two parameter model inversion technique to determine a shear slowness and a mud slowness according to an example implementation.
Figure 12A:
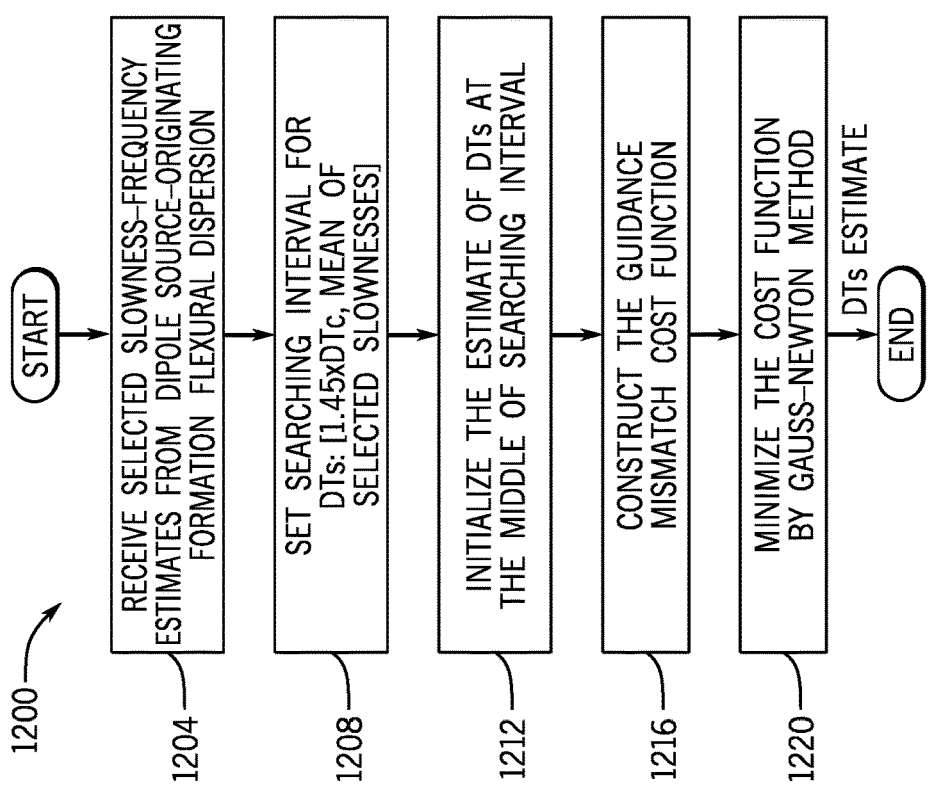
FIG. 12A is a flow diagram depicting a single parameter model inversion technique to determine a shear slowness according to an example implementation.

Thus, referring to FIG. 12A, in accordance with example implementations, a single parameter model inversion technique 1200 includes receiving (block 1204) selected slowness-frequency estimates from a dipole source-originating, extracted formation flexural dispersion and setting (block 1208) a searching interval for the shear slowness estimate. In accordance with example implementations, the estimate of the shear slowness may be initialized at the middle of the searching interval, pursuant to block 1212. Next, the guidance mismatch cost function may be constructed, pursuant to block 1216, and the cost function may be minimized by the Gauss-Newton method, pursuant to block 1220, for purposes of determining the shear slowness.

Alternatively, two parameter model inversion may be used, as depicted by a technique 1230 in FIG. 12B. Pursuant to the technique 1230, selected slowness-frequency estimates from the dipole source-originating extracted formation flexural dispersion are received, pursuant to block 1234; and searching intervals are set (i.e., searching intervals are set for the shear slowness and the mud slowness) pursuant to block 1238. Estimates of the shear slowness and the mud slowness are then initialized, pursuant to block 1242, in the middle of their respective searching intervals. The guidance mismatch cost function may then be constructed, pursuant to block 1246; and the cost function may be minimized, pursuant to block 1250, such as by using the Gauss-Newton method for purposes of determining shear slowness and mud slowness.

The following are examples of results obtained for estimating shear slowness using the technique and systems that are described herein. In particular, synthetically-generated results are presented below for a fast formation and a slow formation. For either dataset, the inverted dipole shear slowness and the corresponding reconstructed dispersion curves are illustrated for purposes of quality control. The following parameters were used:

TABLE 1

| Symbols | Parameters | Fast | Slow | Units |
|---------|------------|------|------|-------|
| $DT_S$ | Formation Shear Velocity/Slowness | 2770 (110) | 1172 (260) | m/s (µs/ft) |

TABLE 1-continued

| Symbols | Parameters | Fast | Slow | Units |
|---|---|---|---|---|
| $DT_C$ | Formation Compressional Velocity/Slowness | 4354 (70) | 2478 (123) | m/s (μs/ft) |
| $\rho_F$ | Formation Density | 1600 | 1600 | kg/m³ |
| $DT_M$ | Mud Velocity/Slowness | 1500 (203) | 1500 (203) | m/s (μs/ft) |
| $\rho_M$ | Mud Density | 1000 | 1000 | kg/m³ |
| $DTs_{tool}$ | Tool Shear Velocity/Slowness | 5756 (53) | 5756 (53) | m/s (μs/ft) |
| $DT_{Ctool}$ | Tool Compressional Velocity/Slowness | 3170 (96) | 3170 (96) | m/s (μs/ft) |
| $\rho_T$ | Tool Density | 7830 | 7830 | kg/m³ |
| D | Borehole Diameter | 0.1650 (6.5) | 0.1650 (6.5) | m (in) |

First, synthetic data was used to simulate a fast formation with the LWD-based acoustic measurement tool centered in the borehole. The physical parameters for the fast formation are given above in Table 1. Twelve axial receivers were placed at distances from 7 feet (ft) to 10.6 ft from the transmitter with an inter-element spacing of 0.33 ft.

Synthetic noiseless waveforms were first generated using the semi-analytic RZX forward model using the specific physical parameters of Table 1 for the fast formation. For the case of high SNR (an SNR of 50 dB, for example), the noiseless waveforms were then contaminated by real field noise.

Figure 13A:
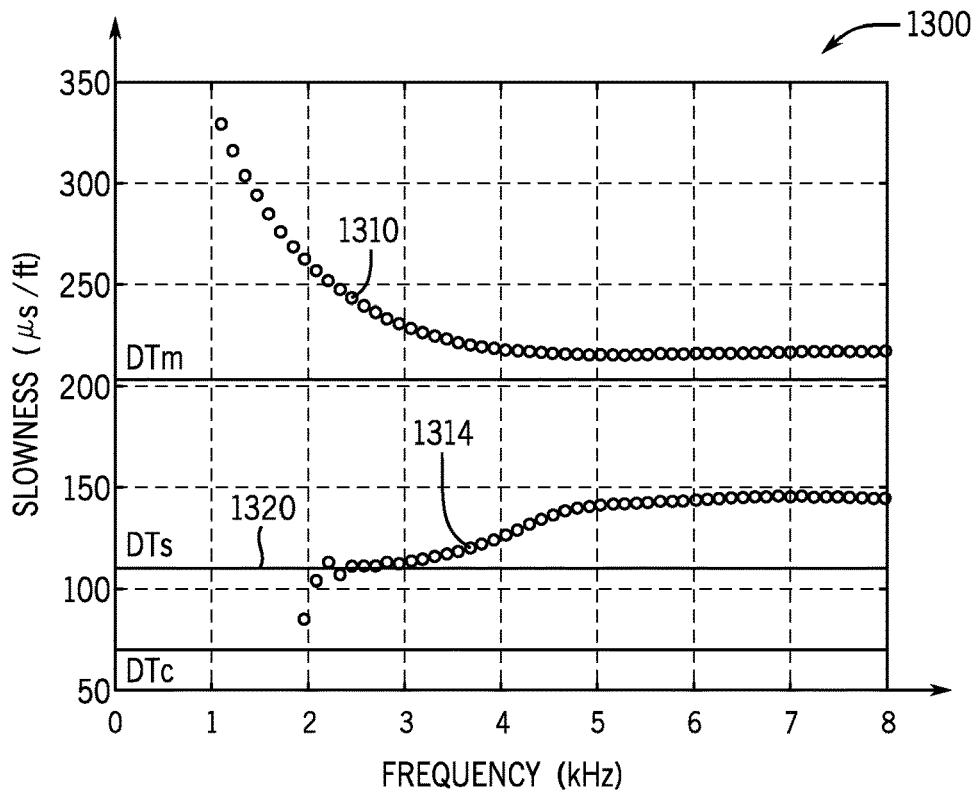
FIG. 13A is an illustration of dispersion extraction for multiple acoustic modes using matrix pencil dispersion extraction and the use of an asymptote associated with a low frequency portion of a formation flexural dispersion to estimate shear slowness according to an example implementation.
Figure 13B:
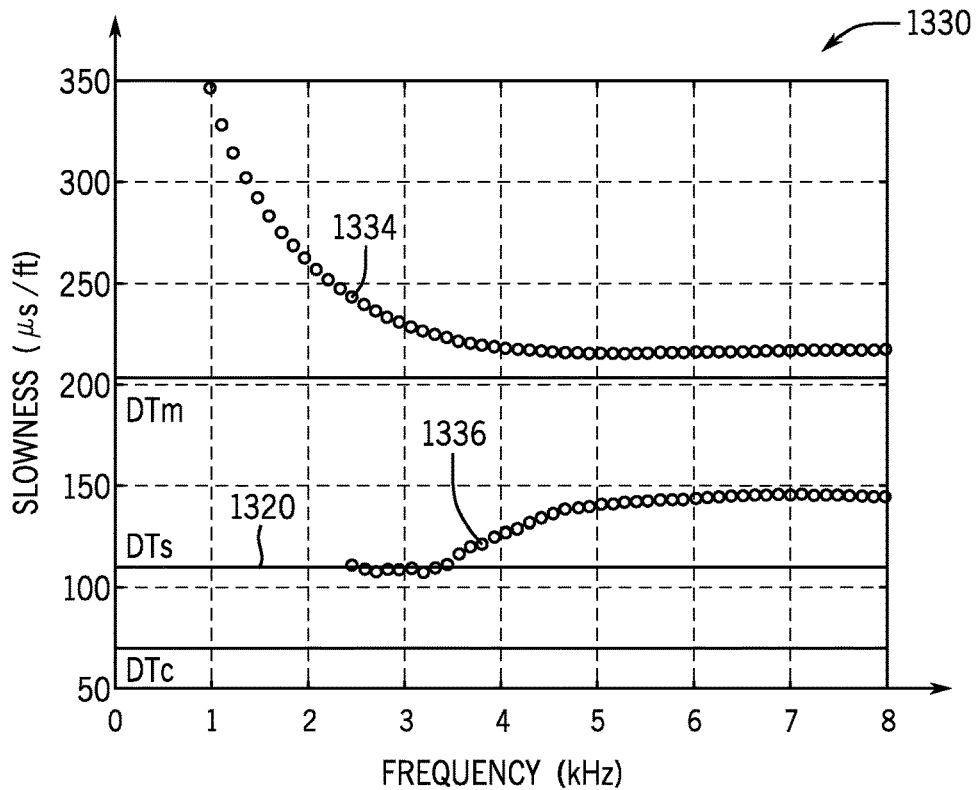
FIG. 13B is an illustration of dispersion extraction for multiple acoustic modes using BBSS-Capon dispersion extraction and the use of an asymptote associated with a low frequency portion of a formation flexural dispersion to estimate shear slowness according to an example implementation.

The extracted dispersion curves by the matrix pencil and BBSS-Capon methods are shown in FIGS. 13A and 13B. In particular, FIG. 13A is an illustration 1300 of a tool flexural dispersion 1310, the actual shear slowness 1320 and a formation flexural dispersion 1314, where matrix pencil dispersion was used; and FIG. 13B is an illustration 1330 of a tool flexural dispersion 1334, a formation flexural slowness dispersion 1336 and an actual mud slowness 1320, where the BBSS-Capon technique was used for the dispersion extraction. As described above, the formation shear slowness may be directly estimated from the low-frequency asymptote of the formation flexural mode in the fast formation and at high SNR. This is evident in FIG. 13A that both techniques give the non-dispersive low-frequency portion of the formation flexural mode, and it aligns well with the true shear slowness reference numeral 1320. Although there are many ways to extract the low-frequency asymptote, the result is demonstrated here by using the slowness-frequency analysis. In accordance with example implementations, the slowness-frequency analysis may be performed by integrating the energy of the extracted dispersion along the frequency direction for a given frequency range and a given slowness interval.

Figure 14:
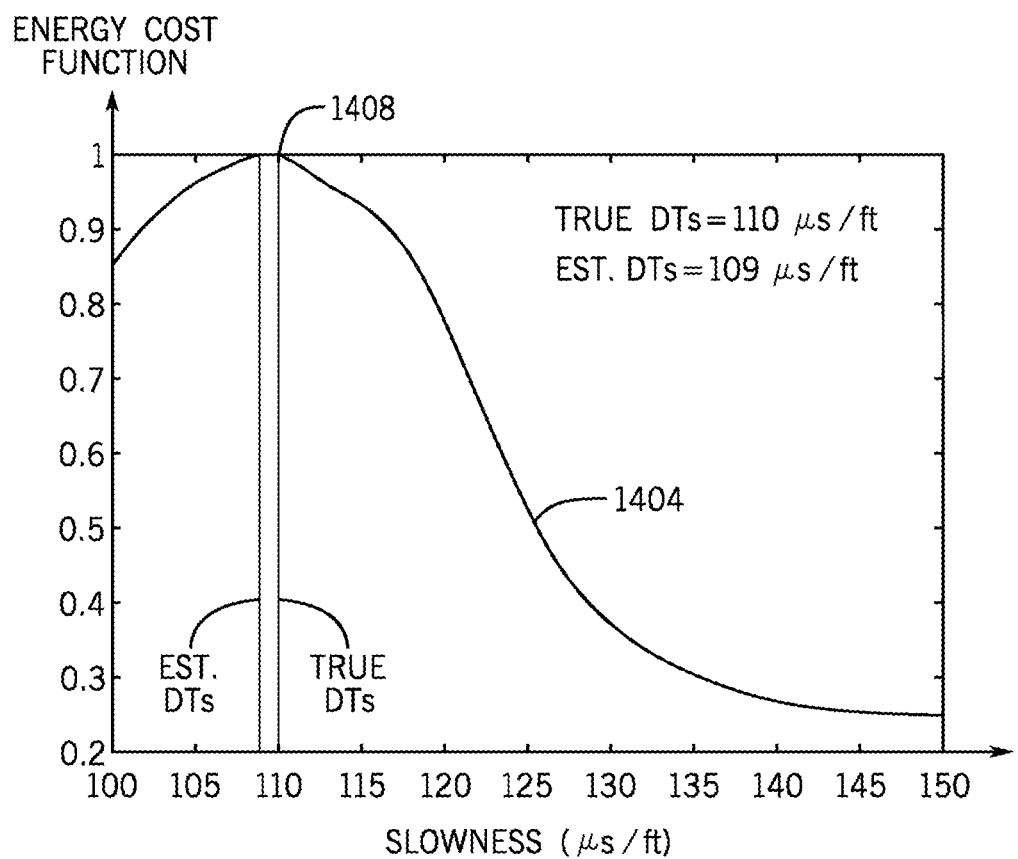
FIG. 14 is a graph of a cost function illustrating the integration of formation mode flexural energy over selected frequency and slowness ranges to determine shear slowness according to an example implementation.

The integration 1400 is illustrated in FIG. 14, where the energy of the formation flexural mode within the frequency range of [0, 3.1] kHz and the slowness interval of [100, 150] micrometers/foot (μs/ft) is accumulated (as indicated by curve 1404) along the frequency domain. The peak of the energy cost function, as illustrated at 1408, is at 109 μs/ft, which aligns with the true formation shear slowness at 110 μs/ft in this fast formation.

For the fast formation cases illustrated in FIGS. 15A to 17F below, the extracted formation flexural dispersion no longer reaches to the formation shear slowness as the SNR is so low that no reliable dispersion can be extracted at the low-frequency region. As a result, the model-based inversion scheme is used to invert the shear slowness using slowness-frequency pairs selected from the formation flexural dispersion (FIGS. 15A to 15F), the tool flexural dispersion (FIG. 16A to 16F), or from both dispersions (FIGS. 17A to 17F).

More specifically, the slowness shear estimation for a moderately low SNR is discussed. As the SNR reduces, the low-frequency portion of the formation flexural mode is overwhelmed by the noise and the stronger tool flexural mode in the fast formation. For the following examples, the SNR is assumed to be 10 dB, and the noisy array waveforms from twelve axial receivers are acquired.

Figures 15D, 15E, 15F:
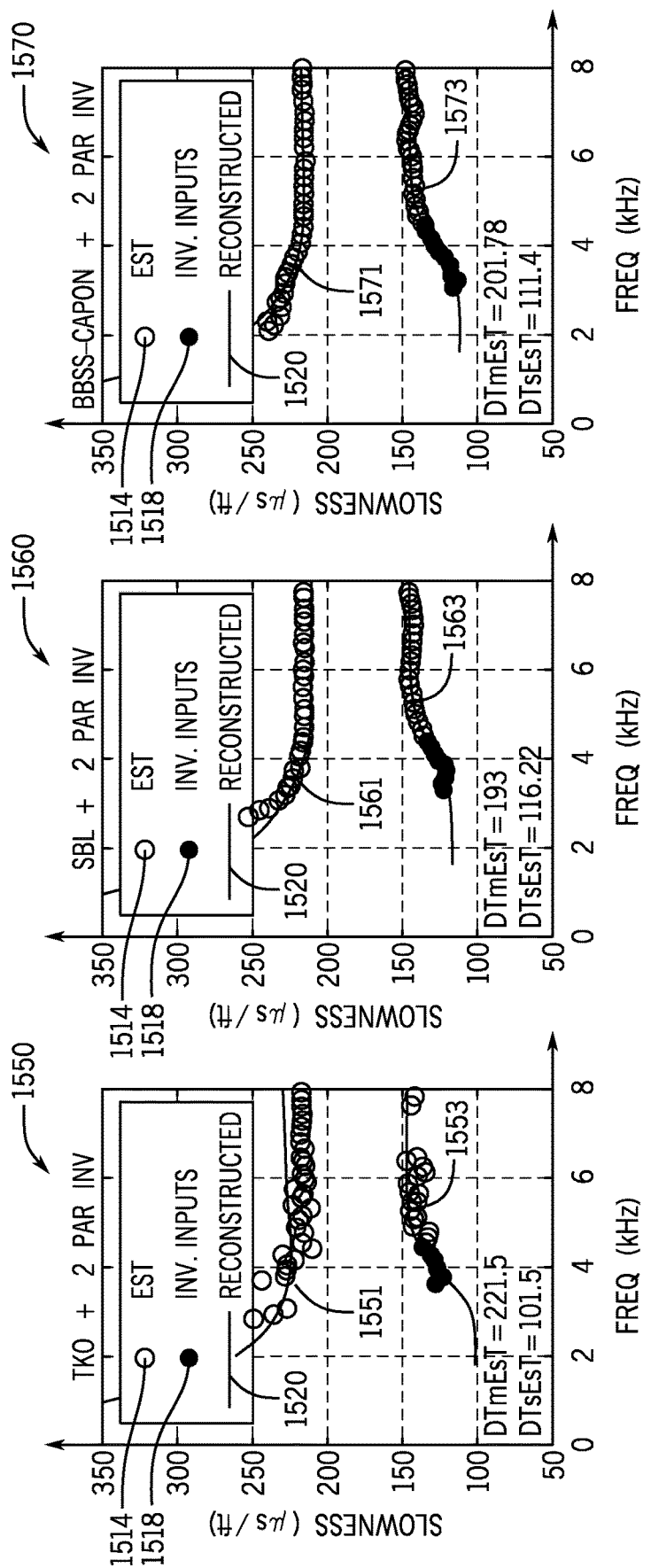
FIG. 15D is an illustration of the use of, for a fast formation, TKO-based dispersion extraction and two parameter model inversion using slowness-frequency inputs selected from an extracted formation flexural dispersion to estimate shear slowness and mud slowness according to an example implementation.
FIG. 15E is an illustration of the use of, for a fast formation, SBL-based dispersion extraction and two parameter model inversion using slowness-frequency inputs selected from an extracted formation flexural dispersion to estimate shear slowness and mud slowness according to an example implementation.
FIG. 15F is an illustration of the use of, for a fast formation, BBSS-Capon-based dispersion extraction and two parameter model inversion using slowness-frequency inputs selected from an extracted formation flexural dispersion to estimate shear slowness and mud slowness according to an example implementation.

For FIGS. 15A to 15C, single parameter model inversion was used to determine the shear slowness; and for FIGS. 15D to 15F, two parameter model inversion was used to determine shear slowness and mud slowness. For FIGS. 15A to 15F, the inversion inputs (represented by the solid dots 1518, as indicated in the keys) were selected only from the formation flexural dispersion (and not from the tool flexural dispersion). In particular, the inversion inputs were selected from the 3 kHz to 4.5 kHz range. As indicated by reference numerals 1514 and 1520 of the keys of FIGS. 15A to 15F, the dispersion estimates are represented by circles, and the reconstructed dispersion curves are represented by solid lines.

In particular, FIG. 15A is an illustration 1500 of extracted tool flexural dispersion values 1529 and extracted formation flexural dispersion values 1530, where TKO-based dispersion extraction was used. FIG. 15B is an illustration 1532 of extracted tool flexural dispersion values 1533 and extracted formation flexural dispersion values 1535, where SBL-based dispersion extraction was used. FIG. 15C is an illustration 1540 of extracted tool flexural dispersion values 1543 and extracted formation flexural dispersion values 1545, where BBSS-Capon-based dispersion extraction was used. FIG. 15D is an illustration 1550 of extracted tool flexural dispersion values 1551 and extracted formation flexural dispersion values 1553, where TKO-based dispersion extraction was used. FIG. 15E is an illustration 1560 of extracted tool flexural dispersion values 1561 and extracted formation flexural dispersion values 1563, where SBL-based dispersion extraction was used. FIG. 15F is an illustration 1570 of extracted tool flexural dispersion values 1571 and extracted formation flexural dispersion values 1573, where BBSS-Capon-based dispersion extraction was used.

In general, the one-parameter inversion results are more accurate as the given mud slowness is essentially the true mud slowness used in the synthetic waveform generation. Particularly, the BBSS-Capon technique gives the best results for both the one-parameter (FIG. 15C) and two-parameter (FIG. 15F) options. It is also noted that the TKO technique with the two-parameter option (FIG. 15E) fails to give a reliable estimate of the shear slowness possibly due to the scattered formation flexural dispersion (high input uncertainty for the model-based inversion). All dispersion extraction techniques fail to deliver correct shear slowness, as the tool flexural dispersion shows high sensitivity to the mud slowness.

Figures 16A, 16B, 16C:
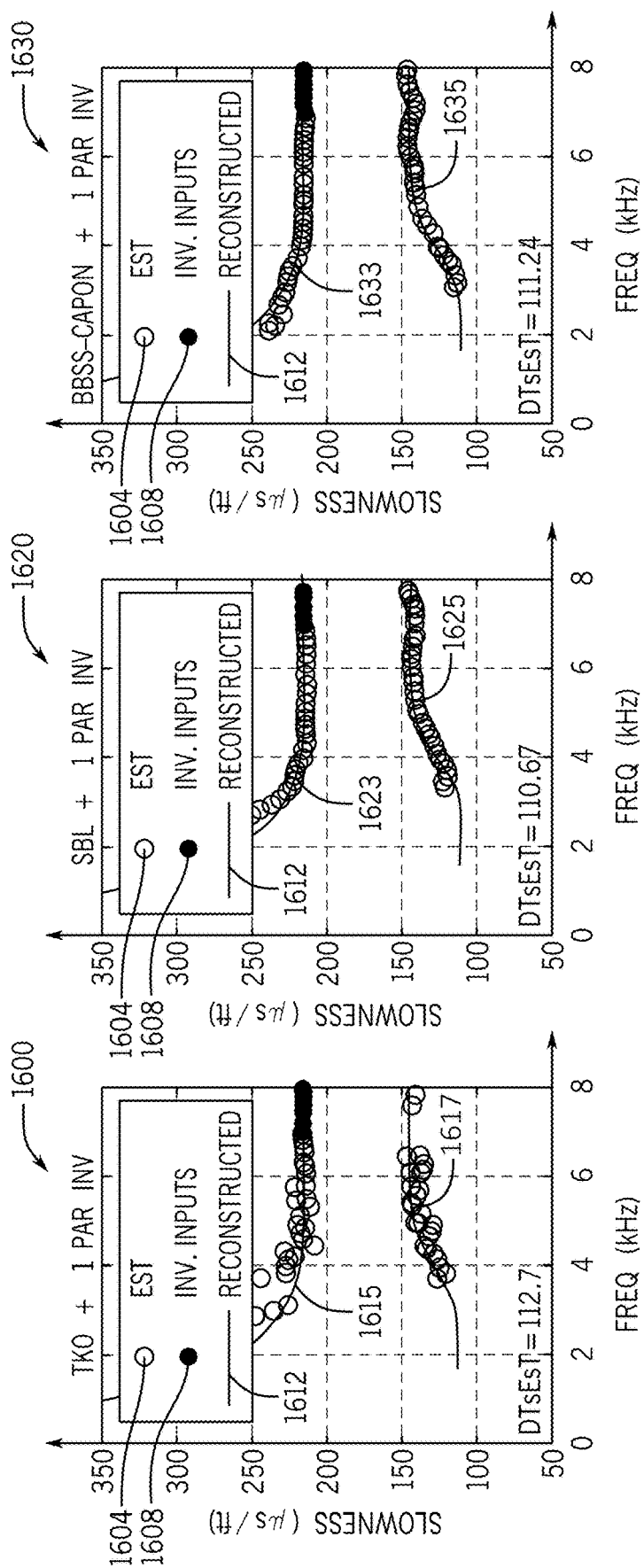
FIG. 16A is an illustration of the use of, for a fast formation, TKO-based dispersion extraction and single parameter model inversion using slowness-frequency inputs selected from an extracted tool flexural dispersion to estimate shear slowness according to an example implementation.
FIG. 16B is an illustration of the use of, for a fast formation, SBL-based dispersion extraction and single parameter model inversion using slowness-frequency inputs selected from an extracted tool flexural dispersion to estimate shear slowness according to an example implementation.
FIG. 16C is an illustration of the use of, for a fast formation, BBSS-Capon-based dispersion extraction and single parameter model inversion using slowness-frequency inputs selected from an extracted tool flexural dispersion to estimate shear slowness according to an example implementation.
Figures 16D, 16E, 16F:
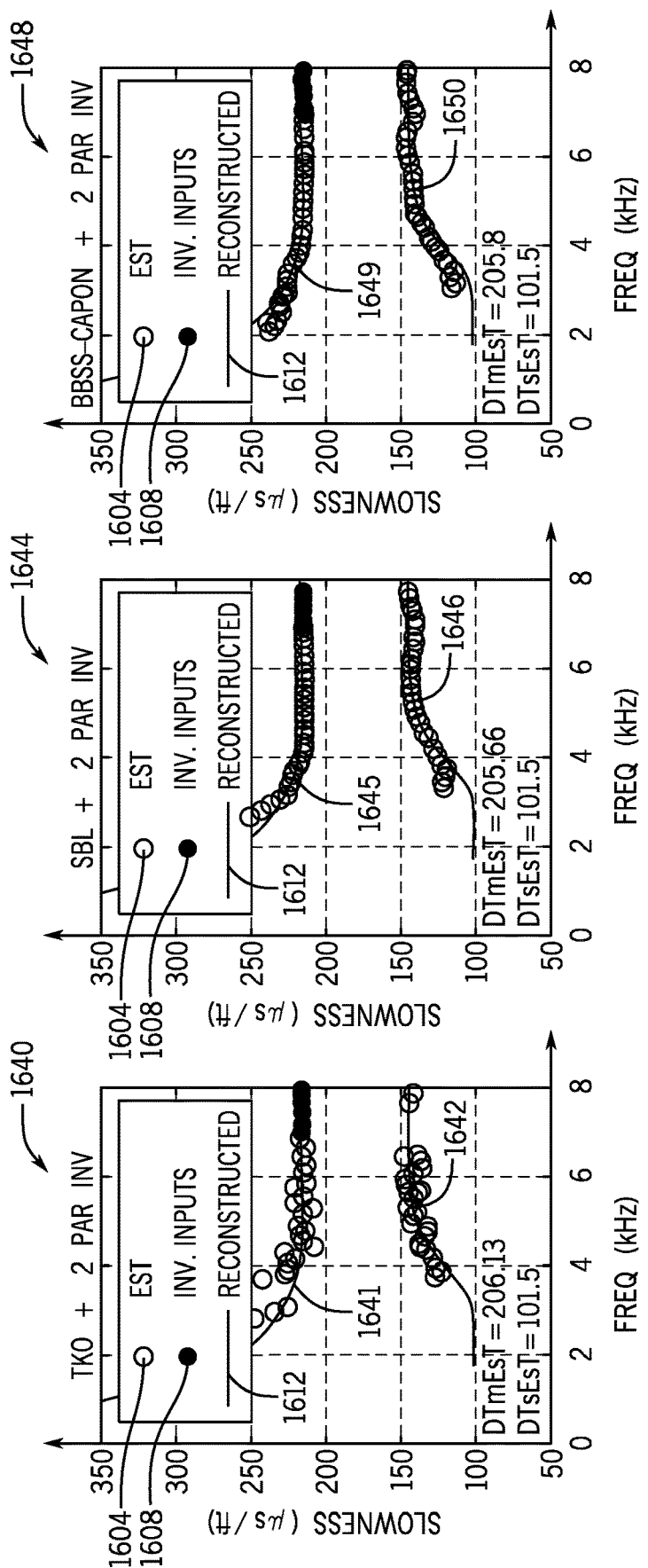
FIG. 16D is an illustration of the use of, for a fast formation, TKO-based dispersion extraction and two parameter model inversion using slowness-frequency inputs selected from an extracted tool flexural dispersion to estimate shear slowness and mud slowness according to an example implementation.
FIG. 16E is an illustration of the use of, for a fast formation, SBL-based dispersion extraction and two parameter model inversion using slowness-frequency inputs selected from an extracted tool flexural dispersion to estimate shear slowness and mud slowness according to an example implementation.
FIG. 16F is an illustration of the use of, for a fast formation, BBSS-Capon-based dispersion extraction and two parameter model inversion using slowness-frequency inputs selected from an extracted tool flexural dispersion to estimate shear slowness and mud slowness according to an example implementation.
Figures 17A, 17B, 17C:
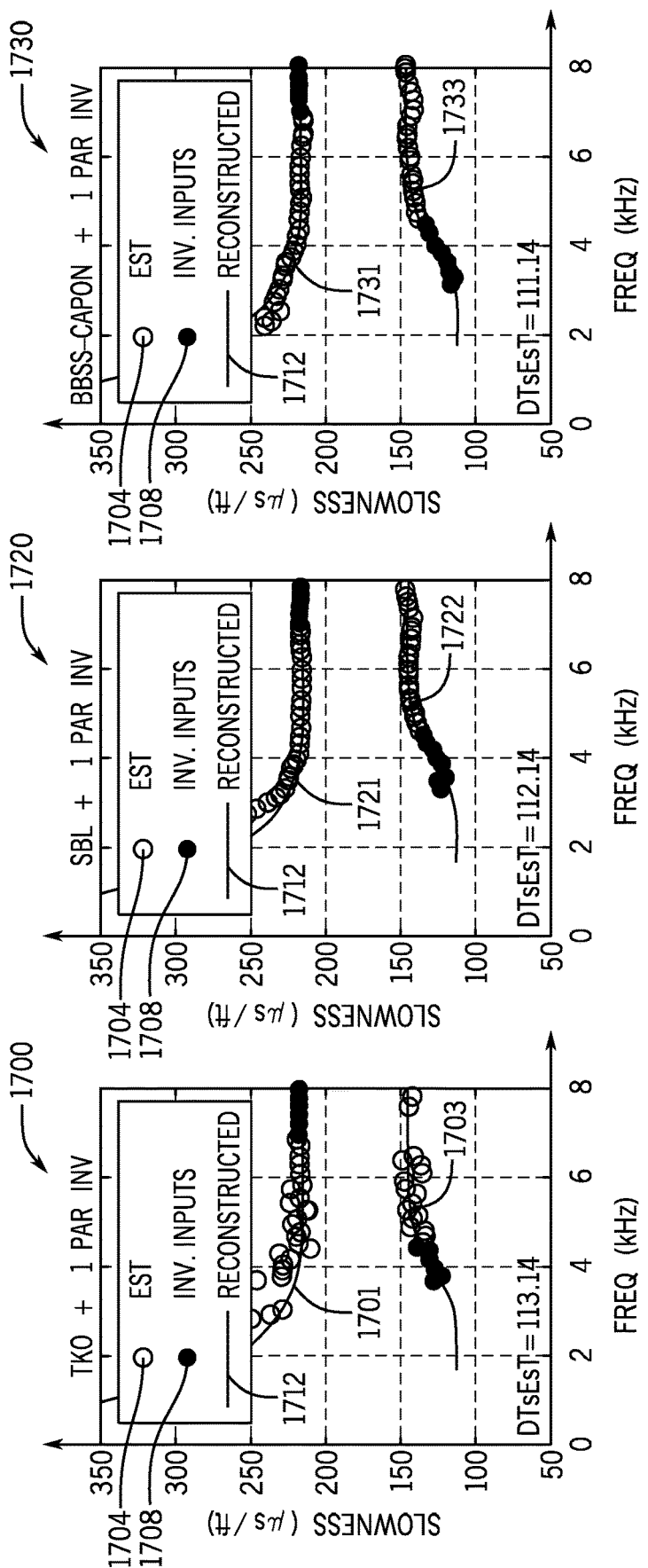
FIG. 17A is an illustration of the use of, for a fast formation, TKO-based dispersion extraction and single parameter model inversion using slowness-frequency inputs selected from extracted formation and tool flexural dispersions to estimate shear slowness according to an example implementation.
FIG. 17B is an illustration of the use of, for a fast formation, SBL-based dispersion extraction and single parameter model inversion using slowness-frequency inputs selected from extracted formation and tool flexural dispersions to estimate shear slowness according to an example implementation.
FIG. 17C is an illustration of the use of, for a fast formation, BBSS-Capon-based dispersion extraction and single parameter model inversion using slowness-frequency inputs selected from extracted formation and tool flexural dispersions to estimate shear slowness according to an example implementation.
Figures 17D, 17E, 17F:
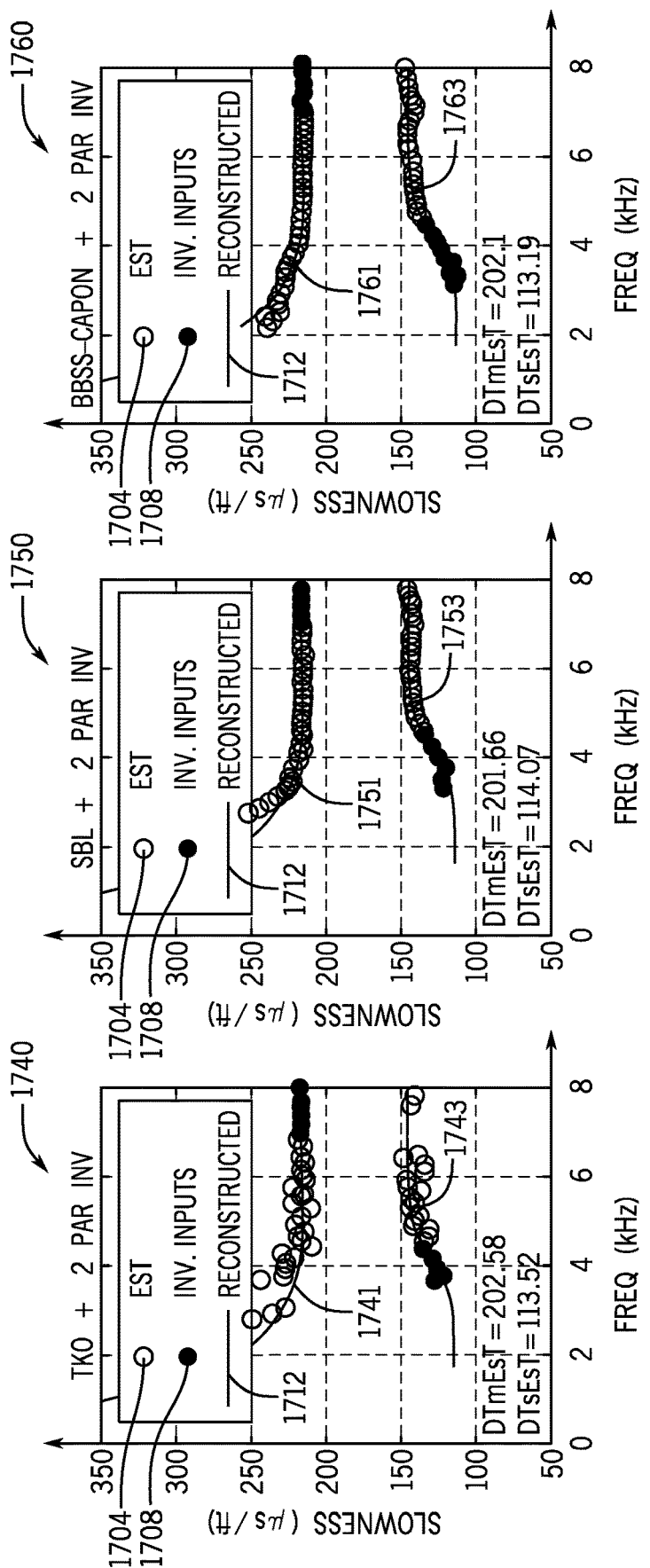
FIG. 17D is an illustration of the use of, for a fast formation, TKO-based dispersion extraction and two parameter model inversion using slowness-frequency inputs selected from extracted formation and tool flexural dispersions to estimate shear slowness and mud slowness according to an example implementation.
FIG. 17E is an illustration of the use of, for a fast formation, SBL-based dispersion extraction and two parameter model inversion using slowness-frequency inputs selected from extracted formation and tool flexural dispersions to estimate shear slowness and mud slowness according to an example implementation.
FIG. 17F is an illustration of the use of, for a fast formation, BBSS-Capon-based dispersion extraction and two parameter model inversion using slowness-frequency inputs selected from extracted formation and tool flexural dispersions to estimate shear slowness and mud slowness according to an example implementation.

For FIGS. 17A to 17C, single parameter model inversion was used to determine the shear slowness; and for FIGS. 17D to 17F, two parameter model inversion was used to determine shear slowness and mud slowness. For FIGS. 16A to 16C, single parameter model inversion was used to determine the shear slowness; and for FIGS. 16D to 16F, two parameter model inversion was used to determine shear slowness and mud slowness. For FIGS. 16A to 16F, the inversion inputs (represented by the solid dots 1608, as indicated in the keys) were selected only from the tool flexural dispersion (and not from the formation flexural dispersion). In particular, the inversion inputs were selected from the 7 kHz to 8 kHz range. As indicated by reference numerals 1604 and 1612 of the keys of FIGS. 16A to 16F, the dispersion estimates are represented by circles, and the reconstructed dispersion curves are represented by solid lines.

In particular, FIG. 16A is an illustration 1600 of extracted tool flexural dispersion values 1615 and extracted formation flexural dispersion values 1617, where TKO-based dispersion extraction was used. FIG. 16B is an illustration 1620 of extracted tool flexural dispersion values 1623 and extracted formation flexural dispersion values 1625, where SBL-based dispersion extraction was used. FIG. 16C is an illustration 1630 of extracted tool flexural dispersion values 1633 and extracted formation flexural dispersion values 1635, where BBSS-Capon-based dispersion extraction was used. FIG. 16D is an illustration 1640 of extracted tool flexural dispersion values 1641 and extracted formation flexural dispersion values 1642, where TKO-based dispersion extraction was used. FIG. 15E is an illustration 1644 of extracted tool flexural dispersion values 1645 and extracted formation flexural dispersion values 1646, where SBL-based dispersion extraction was used. FIG. 16F is an illustration 1648 of extracted tool flexural dispersion values 1649 and extracted formation flexural dispersion values 1650, where BBSS-Capon-based dispersion extraction was used.

Given the true mud slowness, the one-parameter inversion results (FIGS. 16A to 16C) are more accurate by using the tool flexural dispersion than the results by using the formation flexural dispersion (FIGS. 15A to 15F) because the tool flexural dispersion estimation has smaller estimation error than the formation flexural dispersion estimation. However, for the two-parameter inversion in FIG. 16D to 16F, 17A to 17F, the inversion inputs (represented by the solid dots 1708, as indicated in the keys) were selected from both the formation flexural dispersion (in the 3 to 4.5 kHz range) and the tool flexural dispersion (in the 7 to 8 kHz range). As indicated by reference numerals 1704 and 1712 of the keys of FIGS. 17A to 17F, the dispersion estimates are represented by circles, and the reconstructed dispersion curves are represented by solid lines.

In particular, FIG. 17A is an illustration 1700 of extracted tool flexural dispersion values 1701 and extracted formation flexural dispersion values 1703, where TKO-based dispersion extraction was used. FIG. 17B is an illustration 1720 of extracted tool flexural dispersion values 1721 and extracted formation flexural dispersion values 1722, where SBL-based dispersion extraction was used. FIG. 17C is an illustration 1730 of extracted tool flexural dispersion values 1731 and extracted formation flexural dispersion values 1733, where BBSS-Capon-based dispersion extraction was used. FIG. 17D is an illustration 1740 of extracted tool flexural dispersion values 1741 and extracted formation flexural dispersion values 1743, where TKO-based dispersion extraction was used. FIG. 17E is an illustration 1750 of extracted tool flexural dispersion values 1751 and extracted formation flexural dispersion values 1753, where SBL-based dispersion extraction was used. FIG. 17F is an illustration 1760 of extracted tool flexural dispersion values 1761 and extracted formation flexural dispersion values 1763, where BBSS-Capon-based dispersion extraction was used.

Comparing FIGS. 17A-17F with FIGS. 16A-16F and 15A-15F show that the combination of the tool and formation flexural dispersion appears to be more robust to the uncertainty in the mud slowness, especially for the TKO result.

The following discusses synthetically-generated results for a slow formation, with the LWD acoustic measurement tool being centered in the borehole. The physical parameters for the slow formation case are also listed in Table 1. First, the synthetically generated results for an SNR of 10 dB are depicted in FIGS. 18A to 18D. For these examples, single parameter model inversion was used to determine the shear slowness. Moreover, as can be seen, the extracted dispersion estimates are not separable according to the tool and formation acoustic modes. Rather, the two modes are intermingled. As indicated by reference numerals 1804 and 1808 of the keys of FIGS. 18A to 18D, the dispersion estimates are represented by circles, and the inversion inputs are represented by solid dots. In FIGS. 18C and 18D, the reconstructed dispersions are represented by solid lines, as denoted at reference number 1836 in the keys for these figures.

Figure 18A:
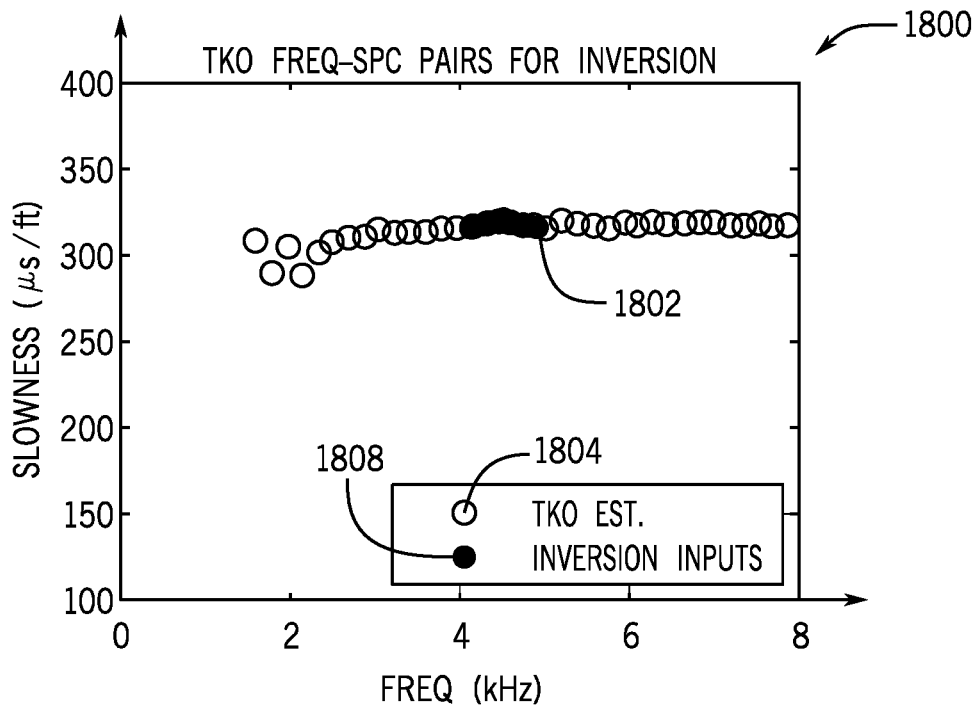
FIG. 18A is an illustration of, for a slow formation and a signal-to-noise ratio (SNR) of 10 decibels (dB), the selection of slowness-frequency inputs for values derived by TKO-based dispersion extraction according to an example implementation.
Figure 18B:
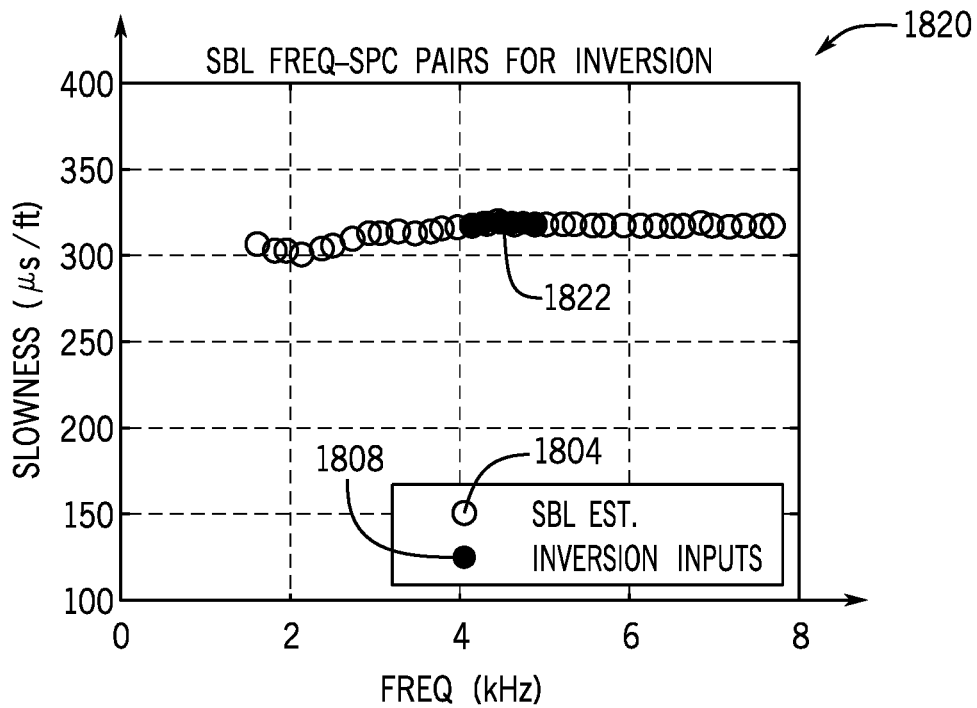
FIG. 18B is an illustration of, for a slow formation and an SNR of 10 dB, the selection of slowness-frequency inputs for values derived by SBL-based dispersion extraction according to an example implementation.
Figure 18C:
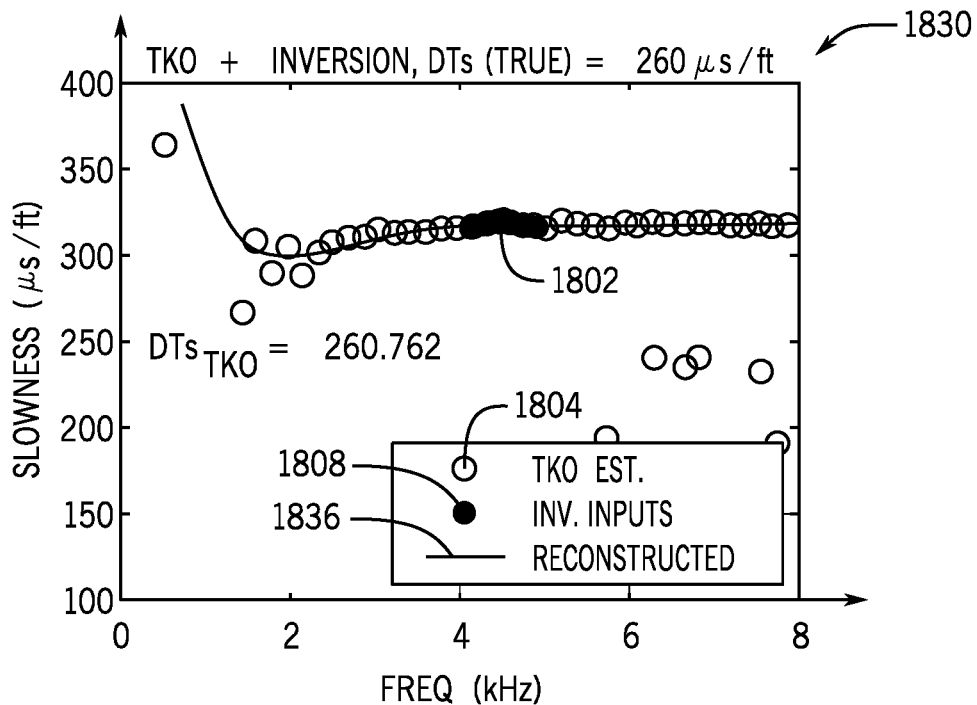
FIG. 18C is an illustration of the use of, for a slow formation and an SNR of 10 dB, TKO-based dispersion extraction and single parameter model inversion using slowness-frequency inputs selected from a mixed formation and tool flexural dispersion to estimate shear slowness according to an example implementation.
Figure 18D:
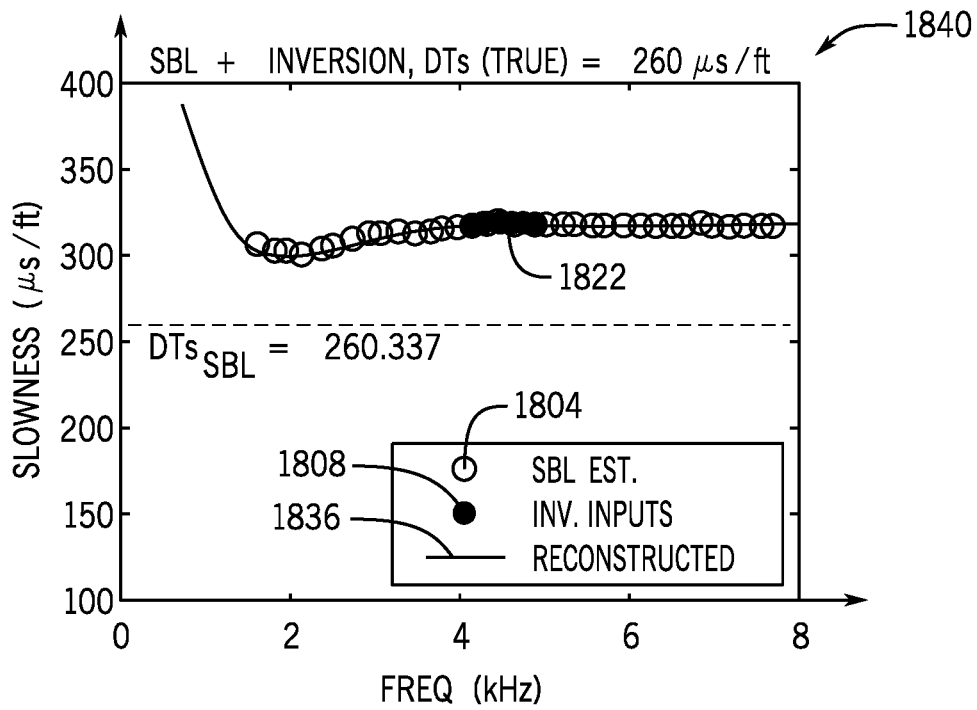
FIG. 18D is an illustration of the use of, for a slow formation and an SNR of 10 dB, SBL-based dispersion extraction and single parameter model inversion using slowness-frequency inputs selected from a mixed formation and tool flexural dispersion to estimate shear slowness according to an example implementation.

FIG. 18A is an illustration 1800 of a combined tool and formation dispersion 1802 obtained by TKO dispersion extraction. The inversion result is depicted in an illustration 1830 of FIG. 18C. FIG. 18B is an illustration 1820 of a combined tool and formation dispersion 1822 obtained by SBL dispersion extraction. The inversion result is depicted in an illustration 1840 of FIG. 18D.

The CRB-based error bars for the flexural dispersion curve can be computed with the estimated amplitudes and slowness parameters. In the slow formation case, the CRB-based error bar suggests that the slowness estimates at higher frequency points tend to be more stable. For the purpose of the shear slowness estimation, the frequency-slowness inputs of the formation flexural mode are selected between 4 kHz and 5 kHz as the inputs for the model-based inversion, as depicted in FIGS. 18A to 18D.

Figure 19A:
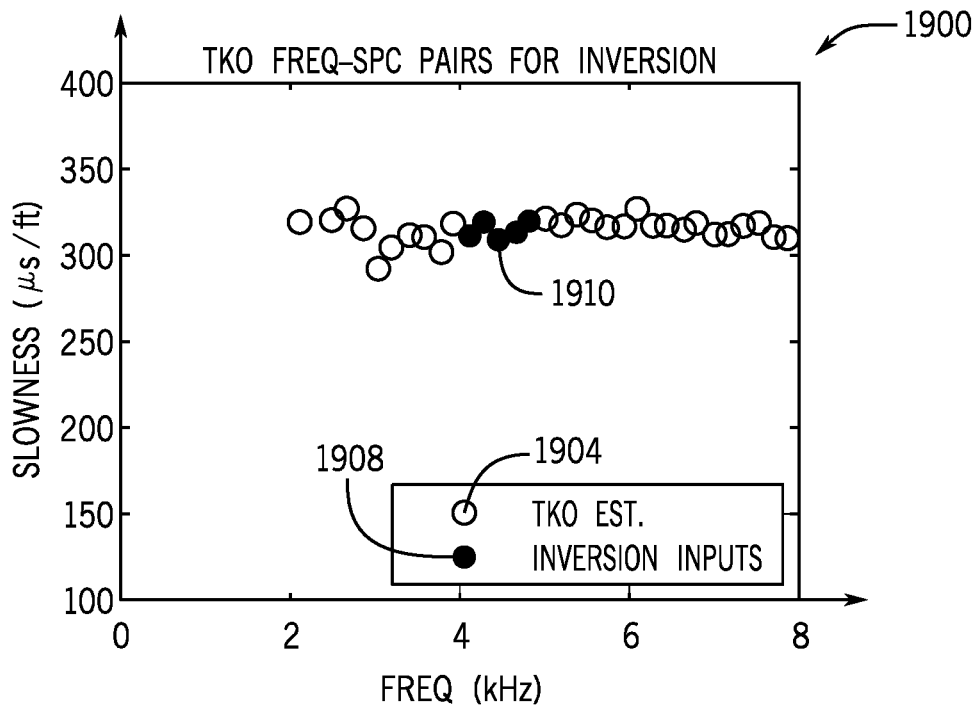
FIG. 19A is an illustration of, for a slow formation and an SNR of 0 dB, the selection of slowness-frequency inputs for values derived by TKO-based dispersion extraction according to an example implementation.
Figure 19B:
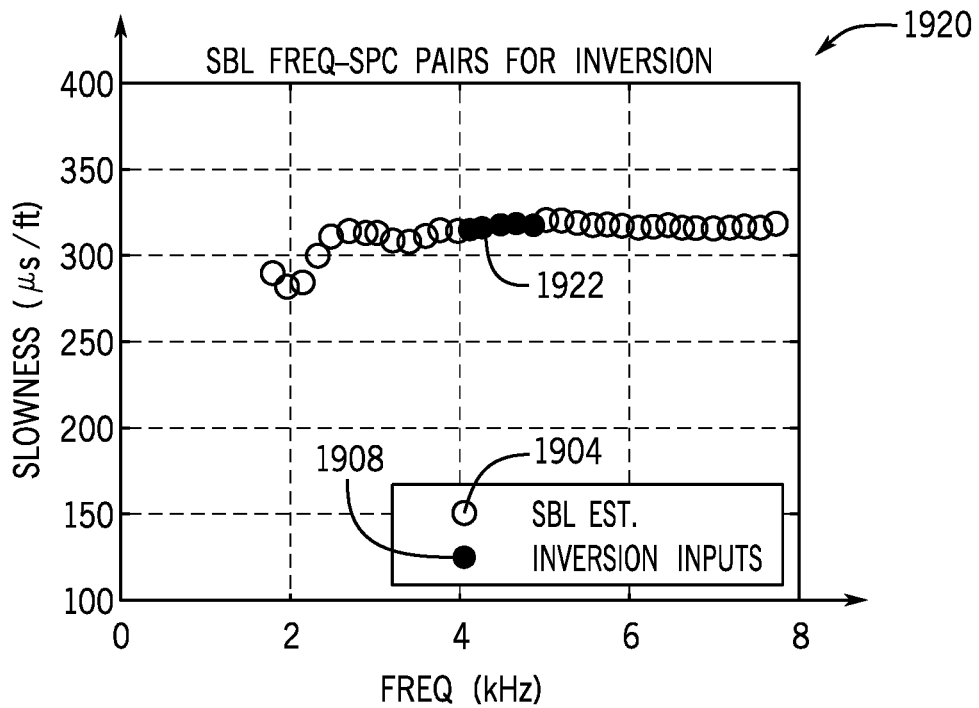
FIG. 19B is an illustration of, for a slow formation and an SNR of 0 dB, the selection of slowness-frequency inputs for values derived by SBL-based dispersion extraction according to an example implementation.
Figure 19C:
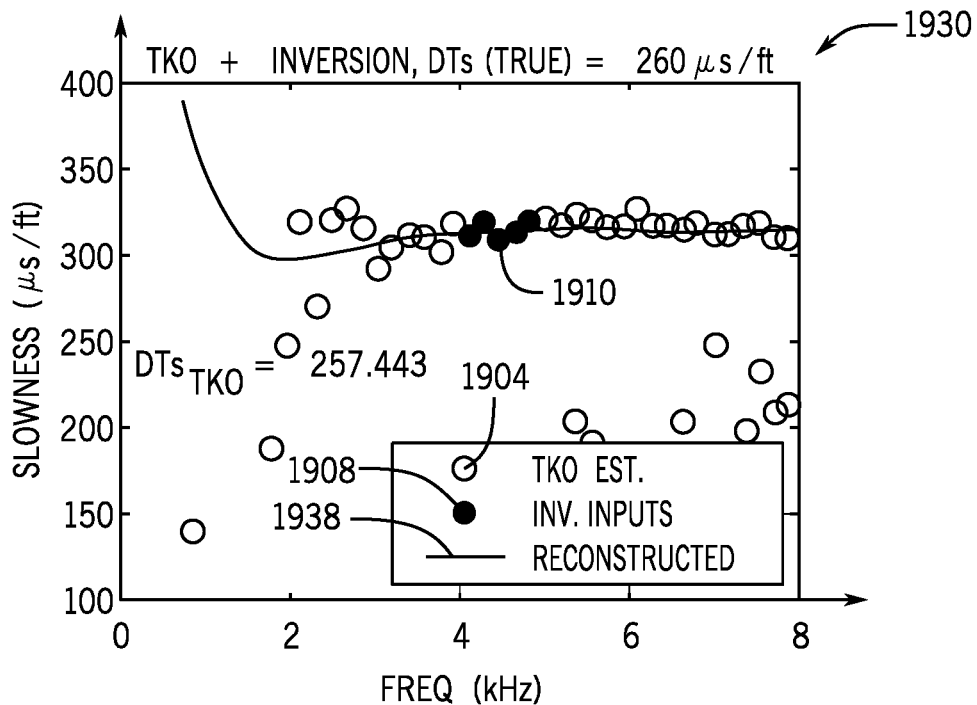
FIG. 19C is an illustration of the use of, for a slow formation and an SNR of 0 dB, TKO-based dispersion extraction and single parameter model inversion using slowness-frequency inputs selected from a mixed formation and tool flexural dispersion to estimate shear slowness according to an example implementation.
Figure 19D:
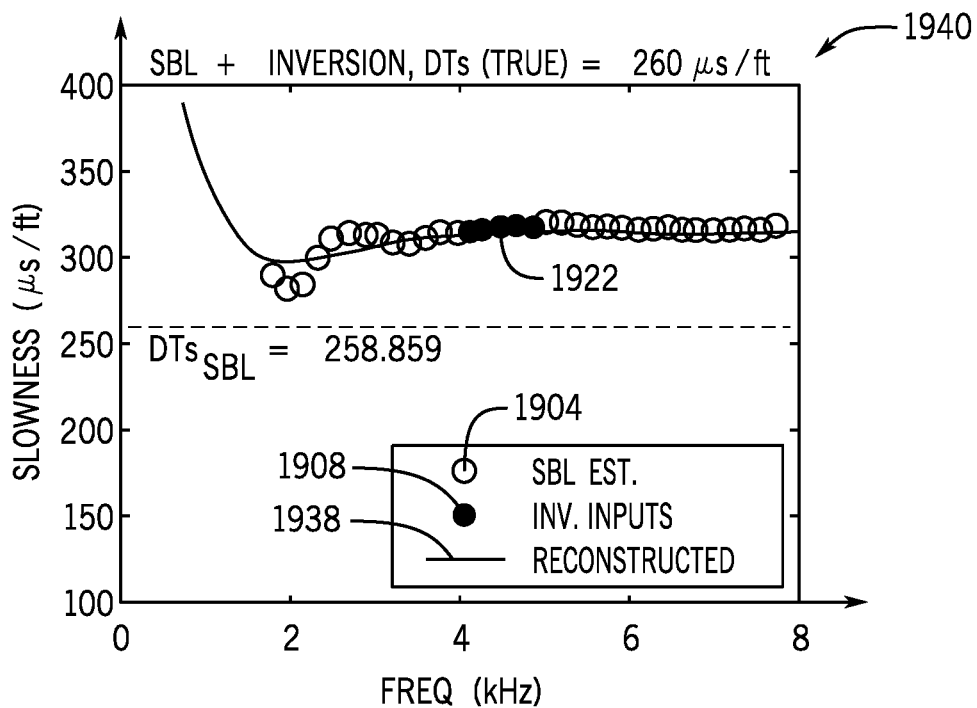
FIG. 19D is an illustration of the use of, for a slow formation and an SNR of 0 dB, SBL-based dispersion extraction and single parameter model inversion using slowness-frequency inputs selected from a mixed formation and tool flexural dispersion to estimate shear slowness according to an example implementation.

Next, synthetically generated results for a slow formation with the physical parameters listed in Table 1, are depicted in FIGS. 19A to 19D for an SNR of 0 dB. For these examples, single parameter model inversion was also used to determine the shear slowness. Moreover, as can be seen, the extracted dispersion estimates are also not separable according to the tool and formation acoustic modes. As indicated by reference numerals 1904 and 1908 of the keys of FIGS. 19A to 19D, the dispersion estimates are represented by circles, and the inversion inputs are represented by solid dots. In FIGS. 19C and 19D, the reconstructed dispersions are represented by solid lines, as denoted at reference number 1938 in the keys for these figures.

FIG. 19A is an illustration 1900 of a combined tool and formation dispersion 1910 obtained by TKO dispersion extraction. The inversion result is depicted in an illustration 1930 of FIG. 19C. FIG. 19B is an illustration 1920 of a combined tool and formation dispersion 1922 obtained by SBL dispersion extraction. The inversion result is depicted in an illustration 1940 of FIG. 19D.

For the lower SNR of 0 dB, the slowness estimates between 4 kHz and 5 kHz were selected to give the inverted formation shear slowness at 257.44 µs/ft for the TKO method and at 258.86 µs/ft for the SBL method, respectively. The reconstructed dispersion curve based on the SBL results depicts a relatively close agreement with the extracted dispersion curve.

Figure 20:
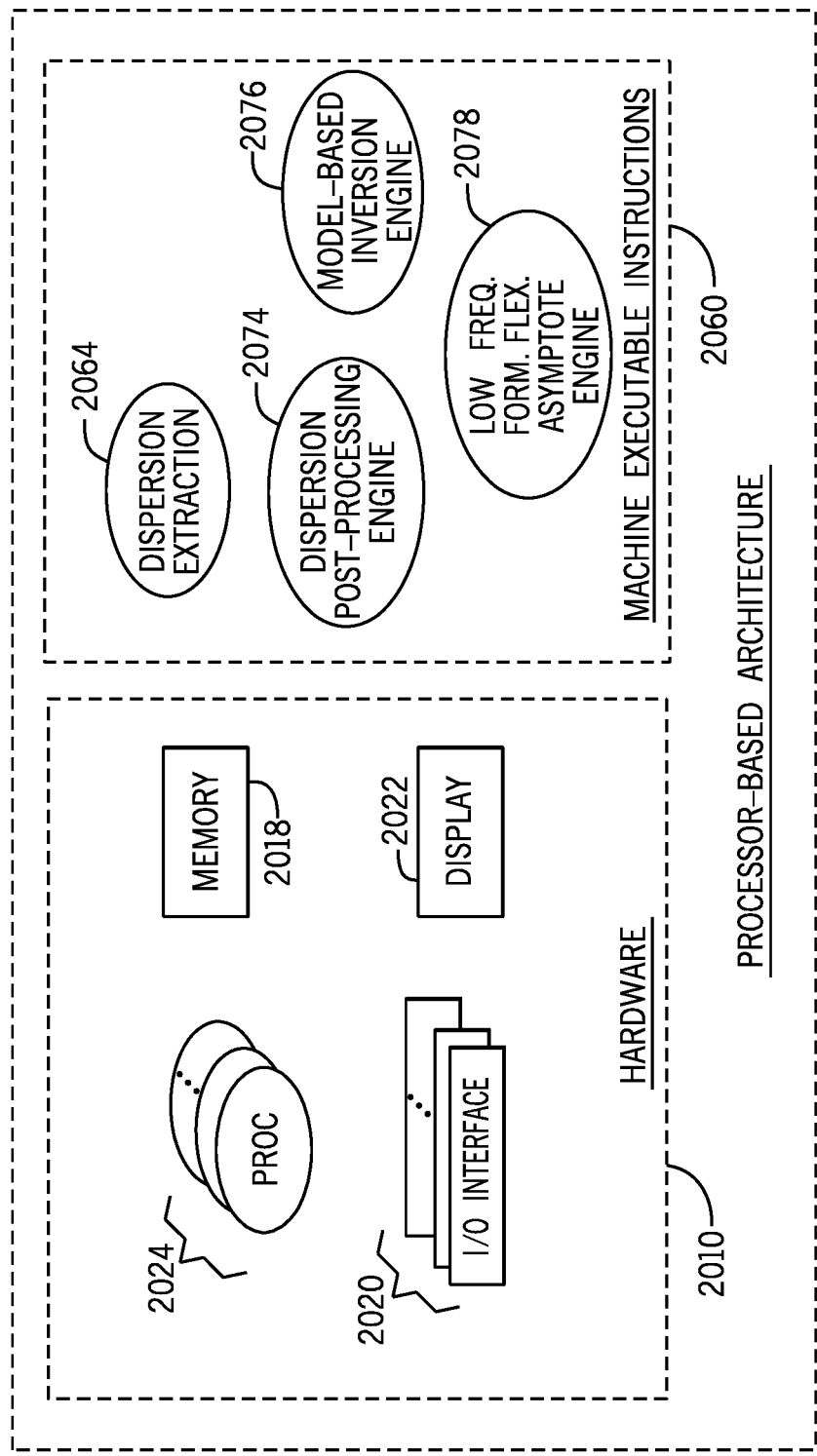
FIG. 20 is a schematic diagram of a processor-based architecture according to an example implementation.

Referring to FIG. 20, in accordance with example implementations, the system of FIG. 2 may be implemented on a processor-based architecture 2000. In general, the processor-based architecture 2000 may be formed from one or multiple actual, physical machines that are made up of actual hardware 2010 and machine executable instructions 2060, or "software." The components of the processor-based architecture may be disposed at the same geographical location or may be disposed at different geographical locations, depending on the particular implementation.

In accordance with example implementations, the processor-based architecture 2000 may be disposed at the Earth surface of a well in which the LWD acoustic measurement tool is deployed; the processor-based architecture 2000 may be disposed downhole in the well with the acoustic measurement tool; the processor-based architecture may be at a remote processing facility with respect to the well; and so forth.

In accordance with some implementations, the hardware 2010 may include one or multiple processors 2024 (one or multiple central processing units (CPUs), one or multiple CPU processing cores, and so forth). The hardware 2010 may further include a memory 2018, which may, for example, contain data representing time domain waveforms acquired by an acoustic measurement tool, parameters relating to dispersion extraction, parameters relating to inversion inputs, CRV input parameters, CRV error bar results, inversion results, and so forth. The memory 2018 may further store executable instructions that, when executed by the processor(s) 2024, cause the processor(s) 2024 to perform some or all of one or more of the techniques that are described herein.

In general, the memory 2018 is a non-transitory memory that may be formed from, as examples, semiconductor storage devices, memristors, magnetic storage devices, phase change memory devices, a combination of one or more of these storage technologies, and so forth, depending on the particular implementation.

In accordance with example implementations, the hardware 2010 of the processor-based architecture 2000 may include various other components, such as one or multiple input/output (I/O) communication interfaces 2020, a display 2022, one or multiple well telemetry interfaces, and so forth. In accordance with some implementations, the display 2022 may display results of dispersion extraction, dispersion estimates, shear slowness estimates, mud slowness estimates, dispersion reconstruction, and so forth.

In accordance with example implementations, the machine executable instructions 2060 may include, for example, instructions that when executed by the processor(s) 2024, cause the processor (s) 2024 to form one or more of the following: instructions 2064 to form the dispersion extraction engine 210 (FIG. 2); instructions 2074 to form the dispersion post processing engine 220 (FIG. 2); instructions 2076 to form the model-based inversion engine 230 (FIG. 2); instructions 2078 to form the low frequency formation flexural asymptote engine 238 (FIG. 2); instructions to form an operating system; and so forth.

In accordance with further example implementations, all or part of the above-described processor-based architecture may be replaced by dedicated, hardwired circuitry or by an application specific integrated circuit (ASIC). Thus, many implementations are contemplated, which are within the scope of the appended claims.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for determining a shear slowness of a subterranean formation, the method comprising:

deploying an acoustic logging while drilling tool in a fluid filled borehole penetrating the subterranean formation, the acoustic logging while drilling tool including an acoustic dipole source and a plurality of spaced apart acoustic receivers;

receiving, by a computer, a plurality of time domain waveforms acquired by the corresponding plurality of receivers in response to acoustic energy emitted by the acoustic dipole source;

processing, by the computer, the plurality of time domain waveforms to extract a multi-mode slowness dispersion, the multi-mode slowness dispersion including a formation flexural acoustic mode and a tool flexural acoustic mode, said processing including:

transforming each of the plurality of time domain waveforms to a corresponding frequency domain waveform;

partitioning the frequency domain waveforms into space frequency blocks having predefined frequency ranges;

applying a broadband spatial smoothing Capon (BBSS Capon) beamforming algorithm to each of the partitioned space frequency blocks to compute a two-dimensional spectrum over a chosen range of group slowness values and phase slowness values, wherein the BBSS Capon beamforming algorithm is executed in three sequential stages, a first de-dispersion stage that uses a candidate group slowness to remove mode dispersion in a wave number domain and output a de-dispersed vector corresponding to each of the frequency domain waveforms, a second spatial smoothing stage that selectively combines the de-dispersed vectors into a plurality of sub-array units along an offset direction of the spaced apart acoustic receivers to form de-dispersed sub-vectors, and a third beamforming stage in which Capon beamforming is applied to the de-dispersed sub-vectors collectively over multiple frequency points by minimizing a sum of output energy to compute the two-dimensional spectrum over the chosen range of group slowness values and phase slowness values;

in each of the space-frequency blocks applying a peak finding algorithm to the computed two-dimensional spectrum over the chosen range of group slowness values and phase slowness values to identify slowness values;
stacking the identified slowness values after each of the space frequency blocks has been processed with the BBSS Capon beamforming algorithm and the peak finding algorithm to obtain the multi-mode slowness dispersion;
selecting, by the computer, a plurality of slowness-frequency pairs from the multi-mode slowness dispersion wherein each slowness-frequency pair comprises a slowness value at a corresponding frequency; and
processing, by the computer, said selected slowness frequency pairs to compute the shear slowness of the subterranean formation.

2. The method of claim 1, further comprising:
repeating said receiving, said processing, and said selecting for multiple firings of the acoustic dipole source, wherein said selecting further comprises comparing a consistency of slowness values determined from the multiple firings.

3. The method of claim 1, wherein:
the subterranean formation is a fast formation; and
computing the shear slowness comprises:
constructing a formation flexural dispersion using the selected slowness-frequency pairs; and
determining an asymptote of the constructed formation flexural dispersion.

4. The method of claim 1, wherein computing the shear slowness comprises inverting for the shear slowness using the selected slowness-frequency pairs.

5. The method of claim 1, wherein said applying the peak finding algorithm to each of the computed two-dimensional spectra further comprises:
integrating the two-dimensional spectrum along the group slowness dimension to compute a one-dimensional spectrum in the phase slowness dimension; and
applying the peak finding algorithm to the one-dimensional spectrum to locate local peaks to estimate the slowness values.

6. The method of claim 1, wherein said selecting the plurality of slowness frequency pairs comprises:
selecting a formation flexural mode from said extracted multi-mode dispersion;
selecting a frequency interval over which a sensitivity of the selected formation flexural dispersion to the shear slowness is above a first threshold; and
selecting the slowness frequency pairs from the selected frequency interval, the selected pairs having an estimated slowness error below a second threshold.

7. The method of claim 6, wherein the estimated slowness error is computed using Cramér-Rao bounds.

8. The method of claim 7, wherein the estimated slowness error is computed as a square root of the Cramér-Rao bounds.

9. The method of claim 6, wherein the estimated slowness error is computed by processing amplitude estimates of the formation flexural mode, amplitude estimates of a tool flexural mode, a noise variance estimate, receiver array configuration parameters, and the selected frequency interval.

10. The method of claim 1, wherein the Capon beamforming is applied to all of the de-dispersed sub-vectors over the multiple frequency points as follows:

$$\ell(s_p, s_g) = \frac{1}{s^H(s_p - s_g)\left[\sum_{f=-F}^{F}\sum_{n=1}^{L-M-1} u_n(s_g, \omega_f)u_n^H(s_g, \omega_f)\right]s(s_p - s_g)}$$

wherein $l(s_p, s_g)$ represents the two-dimensional spectrum over the chosen range of the group slowness values $s_g$ and the phase slowness values $s_p$, $u_n(s_g, \omega_f)$ represent the de-dispersed sub-vectors, and $s(s_p-s_g)$ represents a steering vector constructed based on a mathematical difference between the phase slowness values and the group slowness values.

11. The method of claim 10, wherein the steering vector is constructed as follows:

$$s(s_p-s_g)=[e^{j(s_p-s_g)\omega_0 z_1}, e^{j(s_p-s_g)\omega_0 z_2}, \ldots, e^{j(s_p-s_g)\omega_0 z_M}]^T$$

wherein $\omega_0$ represents a center frequency and $z_i$ represents a distance between the acoustic dipole source and each of the plurality of spaced apart acoustic receivers.

12. The method of claim 1, wherein the second spatial smoothing stage further comprises:
selectively combining the de-dispersed vectors along a receiver offset direction to form a first matrix of forward subvectors and a second matrix of backwards subvectors at each of a plurality of frequencies;
averaging the first matrix of forward subvectors and the second matrix of backwards subvectors to obtain a matrix of average subvectors; and
wherein the Capon beamforming in the third beamforming stage is applied to the matrix of average subvectors.

13. The method of claim 12, wherein the matrix of average subvectors is computed as follows:

$$R(s_g) = \frac{R_f(s_g) + R_b(s_g)}{2}$$

wherein $R(s_g)$ represents the matrix of average subvectors and $R_f(s_g)$ and $R_b(s_g)$ represent the first matrix of forward subvectors and the second matrix of backwards subvectors:

$$R_f(s_g)=\Sigma_{f=-F}^{F}\Sigma_{n=1}^{L-M+1}\tilde{u}_n(s_g,\omega_f)\tilde{u}_n^H(s_g,\omega_f)$$

$$R_b(s_g)=\Sigma_{f=-F}^{F}\Sigma_{n=1}^{L-M+1}\tilde{u}_n(s_g,\omega_f)\tilde{u}_n^H(s_g,\omega_f)$$

wherein $\tilde{u}_n(s_g,\omega_f)=[g_n(s_g,\omega_f), g_{n+1}(s_g,\omega_f), \ldots, g_{n+M-1}(s_g,\omega_f)]^T$ represent the forward sub-vectors and $\tilde{u}_n(s_g,\omega_f)=[g_{L-n+1}(s_g,\omega_f), g_{L-n}(s_g,\omega_f), \ldots, g_{L-n-M+21}(s_g,\omega_f)]^T$ represent the backward sub-vectors, $n=1,2,\ldots,L+M-1$, L represents the number of spaced apart acoustic receivers, and M represents a sub-vector length.

14. The method of claim 1, wherein the first de-dispersion stage uses the candidate group slowness to remove the mode dispersion as follows:

$$g(s_g,\omega_f)=E^H(s_g,\omega_f)y(\omega_f), f=-F,L,0,L,F$$

wherein $g(s_g,\omega_f)$ represents the de-dispersed vector at the candidate group slowness $s_g$, $y(\omega_f)$ represents an array waveform at each frequency $\omega_f$ in which $y(\omega)=[y_1(\omega), y_2(\omega), \ldots, y_L(\omega)]^T$ represents an L×1 vector and collects the array waveforms from L receivers at frequency $\omega$, and T represents the vector transpose;
wherein $E(s_g,\omega_f)$ represents a diagonal matrix as follows $E(s_g,\omega_f)=\text{diag}\{e^{js_g\omega_f z_1} e^{js_g\omega_f z_2} e^{js_g\omega_f z_L}$ with $z_l$ representing a distance between the acoustic dipole source and an l-th receiver in the plurality of spaced apart acoustic receivers.

15. The method of claim 14, wherein the second spatial smoothing stage forms a plurality of the de-dispersed sub-vectors for a given de-dispersed vector g $(s_g, \omega_f)$ according to a preselected sub-vector length M as follows:

$$u_n(s_g,\omega_f)=[g_n(s_g,\omega_f),g_{n+1}(s_g,\omega_f),\ldots,g_{n+M-1}(s_g,\omega(f)]^T$$
$$n=1,2,\ldots,L+M-1$$

wherein $g_n(s_g, \omega_f)$ represents an n-th element in the de-dispersed vector $g(s_g, \omega_f)$.

16. The method of claim 15, wherein the third beamforming stage applies the Capon beamforming to all of the de-dispersed sub-vectors over the multiple frequency points $\{u_n(s_g,\omega_f)\}_{f=-F,\ldots,F}^{n=1,\ldots,L+M-1}$ by minimizing the sum of output energy while passing the desired sub-vector signal distortionless as follows:

$$\ell(s_p, s_g) = \frac{1}{s^H(s_p - s_g)\left[\sum_{f=-F}^{F}\sum_{n=1}^{L-M-1} u_n(s_g, \omega_f)u_n^H(s_g, \omega_f)\right]s(s_p - s_g)}$$

wherein $l(s_p, s_g)$ represents the two-dimensional spectrum over the chosen range of the group slowness values $s_g$ and the phase slowness values $s_p$, $\tilde{u}_n(s_g,\omega_f)$ represent the de-dispersed sub-vectors, and $s(s_p-s_g)$ represents a steering vector constructed based on a mathematical difference between the phase slowness values and the group slowness values; and wherein the steering vector is constructed using center frequency $\omega_0$ as follows:

$$s(s_p-s_g)=[e^{j(s_p-s_g)\omega_0 z_1}, e^{j(s_p-s_g)\omega_0 z_2}, \ldots, e^{j(s_p-s_g)\omega_0 z_M}]^T.$$

17. A system for determining a shear slowness of a subterranean formation, the system comprising:

an acoustic logging while drilling tool configured for deployment in a fluid filled borehole penetrating the subterranean formation, the acoustic logging while drilling tool including an acoustic dipole source and a plurality of spaced apart acoustic receivers;

an interface configured to receive a plurality of time domain waveforms acquired by the plurality of spaced apart acoustic receivers in response to energy being emitted by the acoustic dipole source in the fluid filled borehole; and a processor configured to:

transform each of the plurality of time domain waveforms to a corresponding frequency domain waveform;

partition the frequency domain waveforms into space frequency blocks having predefined frequency ranges;

apply a broadband spatial smoothing Capon (BBSS Capon) beamforming algorithm to each of the partitioned space frequency blocks to compute a two-dimensional spectrum over a chosen range of group slowness values and phase slowness values, wherein the BBSS Capon beamforming algorithm is executed in three sequential stages, a first de-dispersion stage that uses a candidate group slowness to remove mode dispersion in a wave number domain and output a de-dispersed vector corresponding to each of the frequency domain waveforms, a second spatial smoothing stage that selectively combines the de-dispersed vectors into a plurality of sub-array units along an offset direction of the spaced apart acoustic receivers to form de-dispersed sub-vectors, and a third beamforming stage in which Capon beamforming is applied to the de-dispersed sub-vectors collectively over multiple frequency points by minimizing a sum of output energy to compute the two-dimensional spectrum over the chosen range of group slowness values and phase slowness values;

in each of the space-frequency blocks apply a peak finding algorithm to the computed two-dimensional spectrum over the chosen range of group slowness values and phase slowness values to identify slowness values;

stack the identified slowness values after each of the space frequency blocks has been processed with the BBSS Capon beamforming algorithm and the peak finding algorithm to obtain a multi-mode slowness dispersion;

select a plurality of slowness frequency pairs from the multi-mode slowness dispersion; and process the selected slowness frequency pairs to compute the shear slowness of the subterranean formation.

* * * * *